United States Patent
Haapanen

(10) Patent No.: US 9,122,433 B2
(45) Date of Patent: Sep. 1, 2015

(54) CLICK-TO-PRINT SYSTEM, APPARATUS AND METHOD

(71) Applicant: Tom Haapanen, Heidelberg (CA)

(72) Inventor: Tom Haapanen, Heidelberg (CA)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 13/855,083

(22) Filed: Apr. 2, 2013

(65) Prior Publication Data

US 2014/0293325 A1 Oct. 2, 2014

(51) Int. Cl.
*G06F 3/12* (2006.01)

(52) U.S. Cl.
CPC ............ *G06F 3/1268* (2013.01); *G06F 3/1203* (2013.01)

(58) Field of Classification Search
CPC ... G06F 3/1204; G06F 3/1228; G06F 3/1268; G06F 3/1226; G06F 3/1232; G06F 3/1247; G06F 17/30864; G06K 15/1805
USPC ............. 358/1.15, 1.13, 1.16, 1.2, 1.8; 347/2; 709/223; 715/783; 717/177
See application file for complete search history.

(56) References Cited

U.S. PATENT DOCUMENTS

| | | | | |
|---|---|---|---|---|
| 7,461,377 B2 * | 12/2008 | Someshwar et al. | ........... | 718/102 |
| 2004/0125401 A1 * | 7/2004 | Earl et al. | ...................... | 358/1.15 |
| 2005/0270572 A1 * | 12/2005 | Kassan | ......................... | 358/1.15 |
| 2006/0291945 A1 * | 12/2006 | Silverbrook | ................... | 400/693 |
| 2007/0024896 A1 * | 2/2007 | Bounar | .......................... | 358/1.15 |
| 2007/0233834 A1 | 10/2007 | Hattori et al. | | |
| 2007/0234354 A1 | 10/2007 | Hattori | | |
| 2007/0245358 A1 | 10/2007 | Hattori et al. | | |
| 2008/0082578 A1 * | 4/2008 | Hogue et al. | ................ | 707/104.1 |
| 2008/0180726 A1 * | 7/2008 | Selvaraj | ........................ | 358/1.15 |
| 2008/0184162 A1 * | 7/2008 | Lindsey et al. | ................ | 715/783 |
| 2008/0231886 A1 * | 9/2008 | Wehner et al. | ................ | 358/1.15 |
| 2009/0273801 A1 * | 11/2009 | Steele et al. | .................. | 358/1.15 |
| 2011/0063668 A1 * | 3/2011 | Shirai | .......................... | 358/1.15 |
| 2012/0019867 A1 * | 1/2012 | Prati et al. | ..................... | 358/1.15 |
| 2012/0127529 A1 * | 5/2012 | Brown et al. | ................. | 358/1.15 |
| 2012/0250074 A1 * | 10/2012 | Kamppari et al. | ............ | 358/1.15 |
| 2012/0265865 A1 | 10/2012 | Tanaka et al. | | |
| 2012/0266073 A1 | 10/2012 | Tanaka et al. | | |
| 2013/0201503 A1 * | 8/2013 | Miller et al. | .................. | 358/1.13 |

OTHER PUBLICATIONS

"PrintMe Mobile—How It Works", http://w3.efi.com/printme-mobile/how-it-works.
"A mobile solution—EFI PrintMe", 2010.
D. Dineley et al., "Review: 6 AirPrint solutions for iPhones and iPads", Aug. 8, 2012, http://www.infoworld.com/print/199563.
U.S. Appl. No. 13/758,082, Kenji Hagiwara et al., filed Feb. 4, 2013.
U.S. Appl. No. 13/758,116, Greg Melendez et al., filed Feb. 4, 2013.
U.S. Appl. No. 13/758,110, Greg Anderson et al., filed Feb. 4, 2013.

* cited by examiner

*Primary Examiner* — David S Cammack
(74) *Attorney, Agent, or Firm* — Cooper & Dunham LLP

(57) ABSTRACT

Systems, apparatuses and methods are provided for simplifying print job submission by a user in a network environment. A print job in a print job stream from a terminal apparatus is detected and intercepted, and it is determined whether the intercepted print job is to be processed in a job-specific selection mode or a silent mode. In the job-specific selection mode, a printer selection user interface is provided on the terminal apparatus to permit the user to select a specific printer amongst the plural printers, and the intercepted print job is then transmitted to the specific printer. In the silent mode, the user-submitted print job is transmitted to a previously-specified direct printer.

16 Claims, 31 Drawing Sheets

DEVICE INFORMATION

| ID | Name | Manufacturer | Address | Serial No. | Status | Error/Warning | Firmware Version | Department |
|---|---|---|---|---|---|---|---|---|
| 1 | Zebra XL P001 | Company A | 24.16.11.1 | Z000140192 | On | Paper Jam | 3.1.1 | IT |
| 2 | Zebra XP M2 | Company A | 24.16.11.2 | Z002002595 | On | Tray Open | 3.1.2 | Accounting |
| 3 | Zebra XP C1 | Company A | 24.16.11.3 | Z001924859 | Off | Offline | 3.1.2 | Legal |
| 4 | GoodScan M11 | Company B | 24.16.11.4 | 0029582 | Sleep | None | 1.2.1 | Legal |
| 5 | HB12031 | Company C | 24.16.11.5 | 1000229586 | On | None | 2.0 | IT |
| 6 | Noxide 1 | Company D | 24.16.11.6 | 9772338035 | Sleep | Toner Low | 2.009 | Accounting |
| 7 | Rhino X001 SP | Company E | 24.16.142.2 | 0124325331 | On | Tray Open | 10.2.1 | Legal |
| 8 | Rhino X001 SP | Company E | 24.16.142.3 | 0120324647 | On | Paper Low | 10.2.1 | Legal |
| 9 | Rhino X001 SP | Company E | 24.16.142.4 | 0127347369 | On | None | 10.2.1 | IT |
| 10 | Rhino X002 SP | Company E | 24.16.142.5 | 0127347369 | Off | Offline | 11.1.1 | Accounting |
| 11 | Rhino X002 SP | Company E | 24.16.71.1 | 0129984848 | Sleep | None | 11.1.1 | Legal |

Fig. 4A

| PRINTER LOCATION INFORMATION | | |
| --- | --- | --- |
| Device ID | IP Address | Location |
| 1 | 24.16.11.1 | 49, 12 |
| 2 | 24.16.11.2 | 50, 23 |
| 3 | 24.16.11.3 | 38, 41 |
| 4 | 24.16.11.4 | 49, 16 |
| 5 | 24.16.11.5 | 10, 27 |
| 6 | 24.16.11.6 | 25, 83 |
| 7 | 24.16.142.2 | 23, 45 |
| 8 | 24.16.142.3 | 62, 86 |
| 9 | 24.16.142.4 | 17, 15 |
| 10 | 24.16.142.5 | 5, 26 |
| 11 | 24.16.71.101 | 36, 7 |
| 12 | 24.16.71.102 | 17, 45 |
| 13 | 24.16.71.103 | 28, 11 |
| 14 | 24.16.71.104 | 38, 37 |

Fig. 4B

| USER ACCESS INFORMATION | | |
| --- | --- | --- |
| Device ID | IP Address | User Access |
| 1 | 24.16.11.1 | A, B, C |
| 2 | 24.16.11.2 | A, B, D |
| 3 | 24.16.11.3 | B |
| 4 | 24.16.11.4 | B, E |
| 5 | 24.16.11.5 | C, E |
| 6 | 24.16.11.6 | A |
| 7 | 24.16.142.2 | A, B |
| 8 | 24.16.142.3 | A, B |
| 9 | 24.16.142.4 | C, D |
| 10 | 24.16.142.5 | A, B, C, D |
| 11 | 24.16.71.101 | E, F |
| 12 | 24.16.71.102 | E, F |
| 13 | 24.16.71.103 | E, F |
| 14 | 24.16.71.104 | E, F |

Fig. 4C

| CONFIGURATION ITEM INFORMATION | | |
|---|---|---|
| Item ID | Item Name | Item Value |
| 1 | CurrentPrinterAddress | 192.15.201.102 |
| 2 | Silent | 0 |
| 3 | ServerAddress | 192.15.201.101 |
| 4 | CacheExpire | 30000 |
| 5 | NearbyBits | 8 |
| 6 | HideNearby | 0 |
| 7 | HideFavorites | 0 |
| 8 | HideBrowse | 0 |
| 9 | HideFilter | 0 |
| 10 | HideMap | 0 |
| 11 | Favorites | favorites_1.lst |
| 12 | CurrentFilter | custom_1 |
| 13 | Fields | fields.csv |
| 14 | Categories | categories.csv |

Fig. 4D

| Devices – Device Management Tools (v1.0) | | | | | |
|---|---|---|---|---|---|
| Home | Help | | | | |
| Print | Cancel | Recent | Nearby | Favorites | |
| Print | | View | | | |

| Device Name | Address | Serial No. | Status | Error/Warning |
|---|---|---|---|---|
| Zebra XL P001 | 24.16.11.1 | Z000140192 | On | Paper Jam |
| Zebra XP M2 | 24.16.11.2 | Z002002595 | On | Tray Open |
| Zebra XP C1 | 24.16.11.3 | Z001924859 | Off | Offline |
| GoodScan M11 | 24.16.11.4 | 0029582 | Sleep | None |
| HB12031 | 24.16.11.5 | 1000229586 | On | None |
| Noxide 1 | 24.16.11.6 | 9772338035 | Sleep | Toner Low |
| Rhino X001 SP | 24.16.142.2 | 0124325331 | On | Tray Open |
| Rhino X001 SP | 24.16.142.3 | 0120324647 | On | Paper Low |
| Rhino X001 SP | 24.16.142.4 | 0127347369 | On | None |
| Rhino X002 SP | 24.16.142.5 | 0127347369 | Off | Offline |
| Rhino X002 SP | 24.16.71.1 | 0129984848 | Sleep | None |
| Unicopy 1095S | 24.16.71.2 | 9526355 | Sleep | None |
| Unicopy 1095X | 24.16.71.3 | 9526991 | On | Warming Up |
| Unicopy 1095X | 24.16.71.4 | 9526700 | Sleep | None |
| Unicopy 1095X | 24.16.71.5 | 9526927 | Off | Offline |
| Unicopy 1095L | 24.16.71.6 | 9526284 | On | Paper |

(−) IP Address
 (−) 24
  24.16.11
  24.16.142
  24.16.71
  24.16.1
  24.16.225
  (−) 24.16
   24.16.17
   24.16.18
   24.16.1
   24.16.0

Fig. 12B

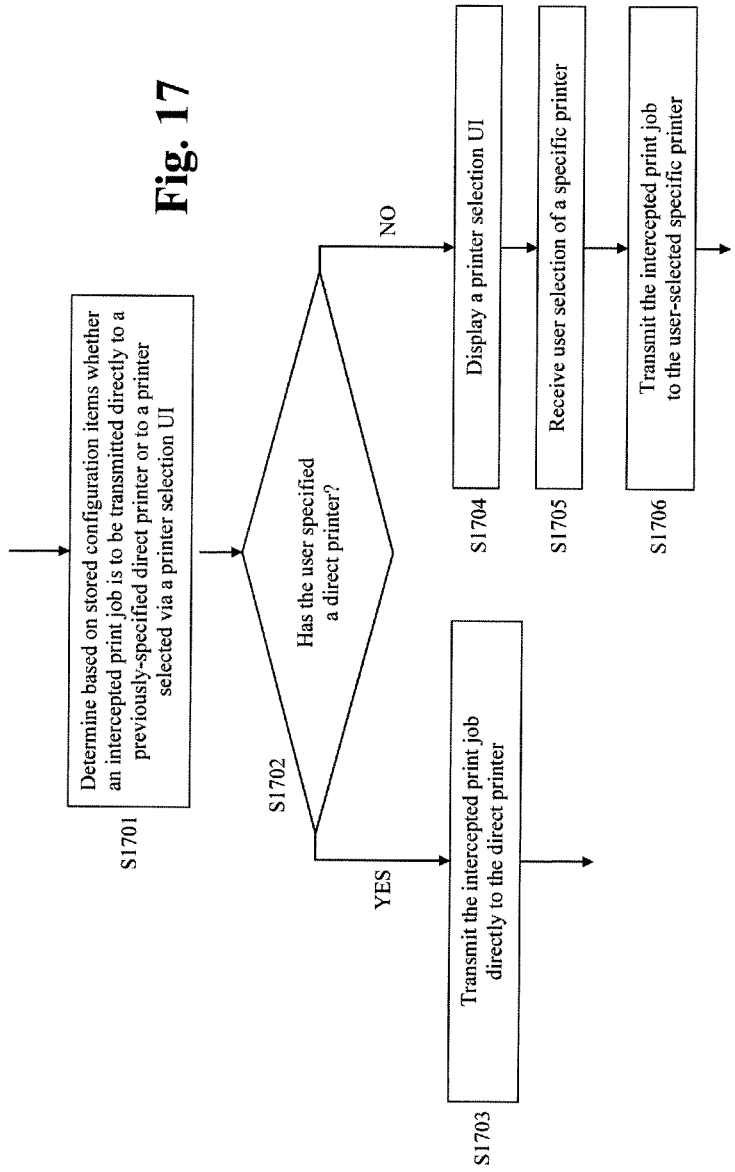

CLICK-TO-PRINT SYSTEM, APPARATUS AND METHOD

TECHNICAL FIELD

This disclosure relates to tools (such as systems, apparatuses, methodologies, computer program products, etc.) for simplifying print job submission, and more particularly, for simplifying print job submission by a user in a network environment.

BACKGROUND

In the current information age, information technology (IT) tools are extensively used in enterprises and other organizations in order to facilitate processing of documents and data.

Typically, a network environment includes a plurality of printing devices, any of which may be used to print a document. When a user prints a document, the user is displayed a list of printers that are currently installed on the user's computer. However, such list does not include any newly available printers that have not been installed on the user's computer. Further, in many instances, the number of available printing devices is too large for the user to readily identify which printer is most suitable for the print job at hand.

There exists a need for an improved method for printing in a network environment.

SUMMARY

Various tools (for example, a system, an apparatus, application software, etc.) can be provided to simplify printing for a user in a network environment having a plurality of printers.

In an aspect of this disclosure, a click-to-print program operates on a user terminal to detect and intercept a print job in a print job stream. At such time, a group of printers, determined based on user identification and/or user location information, is presented in a printer selection user interface (UI) for user selection of a specific printer amongst the plural printers. Upon selection of a specific printer, the intercepted print job is transmitted to the specific printer. In such approach, it is not necessary to maintain a separate driver for each printer device and it is not necessary to install a printer definition and/or print queue for each output device. Further, the user need not identify a suitable printer for the print job. Instead, the user can simply click the print button and the print job will be submitted in a print job stream, and at such time, the printers that may be of use to the user can be determined.

For example, such approach can be integrated with a device management system, in order to access the device data maintained by the device management system. The click-to-print program can be configured to obtain a list of printers from a device management unit or a device database maintained by the device management system which manages the printers.

In another aspect, a click-to-print program may operate in either of a job-specific selection mode or a silent mode. In job-specific selection mode, the printer selection UI displays a group of printers extracted from the list of printers managed by device management system, and such group is preferably a limited subset of the managed printers that contains printers determined to be more likely to be selected by the user. On the other hand, in silent mode, the print job submission part causes the user-submitted print job to be transmitted to a previously-specified direct printer.

In another aspect, a mode selection user interface is provided on the terminal apparatus, through which the user can specify a direct printer. After a direct printer is specified for silent mode, print jobs submitted by the user are automatically transmitted to the direct printer without prompting the user to select a printer. A mode determination part may determine whether an intercepted print job is to be processed in job-specific selection mode or in silent mode based on whether the user has specified a direct printer.

In another aspect, the printer selection UI may be configured to include any of various features to simplify the printer selection process for the user. For example, the printer selection UI can include a filter part for filtering the display of printers to limit displayed printers to those matching one or more filter criteria. As another example, the printer selection UI may include a map viewing part for displaying a map view of printers at or near a specified location (for example, the location of the user or the terminal apparatus). Since the map view graphically shows a location of each specific printer on a map, the user can readily select a locationally-preferred printer. Further, the map viewing part may be configured to display printer characteristics or properties of the selected printer.

BRIEF DESCRIPTION OF THE DRAWINGS

The aforementioned and other aspects, features and advantages can be more readily understood from the following detailed description with reference to the accompanying drawings wherein:

FIG. 4A shows sample device information, according to an exemplary embodiment;

FIG. 4B shows sample printer location information, according to an exemplary embodiment;

FIG. 4C shows sample user access information, according to an exemplary embodiment;

FIG. 4D shows sample configuration item information, according to an exemplary embodiment;

FIGS. 12A-12D show sample screenshots of a printer selection UI, according to an exemplary embodiment;

FIG. 17 shows a flowchart of a method of managing printing in a network environment, according to another exemplary embodiment.

DETAILED DESCRIPTION

Figure 1:
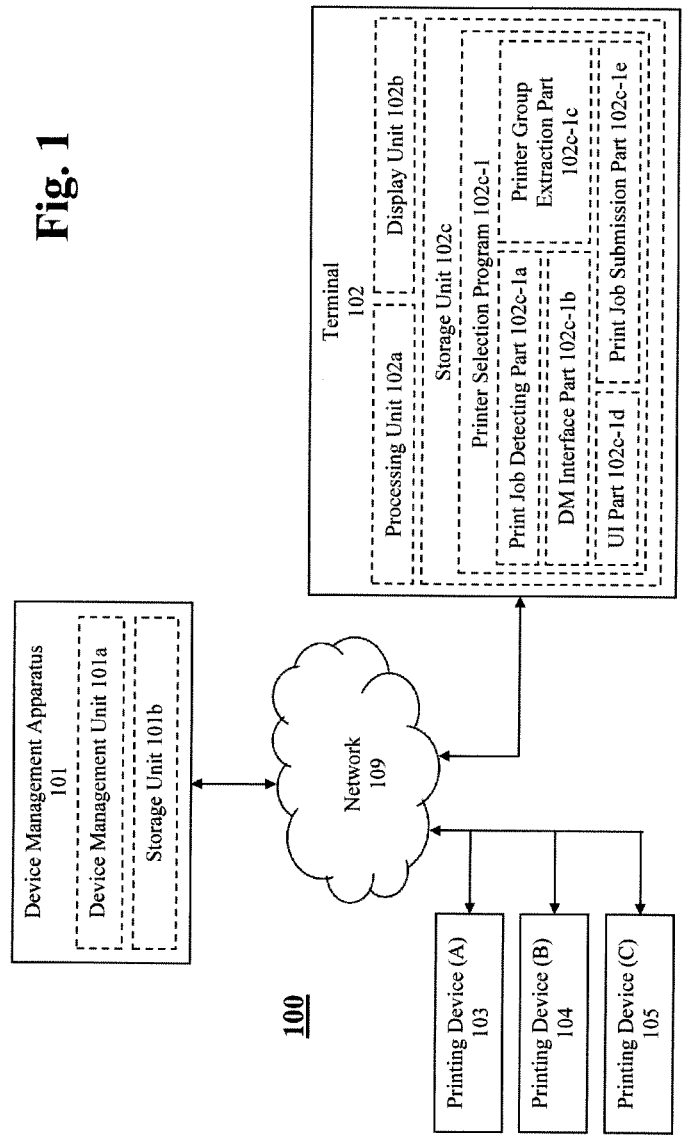
FIG. 1 shows a block diagram of a system for managing a plurality of network-connected devices, according to an exemplary embodiment.

In describing preferred embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner. In addition, a detailed description of known functions and configurations will be omitted when it may obscure the subject matter of the present invention.

Referring now to the drawings, wherein like reference numerals designate identical or corresponding parts throughout the several views, there are described tools (systems, apparatuses, methodologies, computer program products, etc.) for managing user printing in a network environment having a plurality of printers, multi-function devices, and other network-connected, or standalone, devices.

For example, FIG. 1 shows schematically a system 100 for managing user printing in a network environment, according to an exemplary embodiment. The system 100 includes a device management apparatus 101 including a device management unit 101a ad a storage unit 101b, a terminal 102, printing devices 103-105, all of which are interconnected by a network 109.

In the example of FIG. 1, the device management unit 101a of the device management apparatus 101 is configured to manage the printing devices 103-105 and collect device data from the printing devices 103-105. The device data collected by the device management unit 101a is further described infra with reference to FIG. 4A.

Referring back to FIG. 1, the terminal 102 includes a processing unit 102a, a display unit 102b and a storage unit 102c. The storage unit 102 includes a printer selection program 102c-1 which includes a print job detecting part 102c-1a, a device management interface part 102c-1b, a printer group extraction part 102c-1c, a user interface part 102c-1d and a print job submission part 102c-1e.

For example, the printer selection program 102c-1 may be executed by the processing unit 102a, causing the display unit 102b to display a printer selection user interface (UI) to the user at the terminal 102. The terminal 102 is further described infra with reference to FIG. 5B.

The print job detecting part 102c-1a of the printer selection program 102c-1 is configured to detect and intercept a print job in a print job stream from the terminal apparatus. For example, the detecting part 102c-1a may integrate with a port monitor (such as Localspl.dll or Usbmon.dll) which controls i/o (input/output) ports (such as LPT*, COM*, etc.) through which print jobs may be sent to a local printer. In addition, the print job detecting part 102c-1a may interface with a port monitor that enables printing to remote printers or network printers (such as standard TCP/IP port monitor). In such instance of a TCP/IP port monitor, the print job is typically configured as a RAW-formatted job to be transmitted via a TCP stream. On the other hand, some print jobs may be submitted via a WSD (Web Services for Devices) port and thus the print job detecting part 102c-1a may be configured to interface with a WSD port monitor as well.

Although port monitors are provide as an example, it should be appreciated that print job detection can be performed even when port monitors are not available, such as, for example, in the case of LPR/LPD printing, as well as on other platforms. For example, on some platforms, such as, for example, those that adopt CUPS (Common Unix Printing System), print job detection can be performed by monitoring the spooler.

The device management interface part 102c-1b of the printer selection program 102c-1 obtains a list of plural printers, through a network, from a device management unit that manages said plural printers. The printer group extraction part 102c-1c of the printer selection program 102c-1 extracts, from the list of said plural printers, a group of printers, based on at least one of an identity of the user or a location of the terminal apparatus. The user interface part 102c-1d of the printer selection program 102c-1 provides a printer selection user interface on the terminal apparatus to permit the user to select a specific printer amongst the plural printers, the printer selection user interface including a printer viewing part for displaying one or more printers based on the group of printers extracted by the printer group extraction part. The print job submission part 102c-1e of the printer selection program 102c-1 causes the intercepted print job to be transmitted to the specific printer.

Referring back to FIG. 1, the printing devices 103-105 may include, for example, a printer and/or a multi-function device (MFD). While this example of this disclosure simply refers to the printing devices 103-105 in the interest of brevity, the aspects of this disclosure are applicable to a network environment having an arbitrary number of devices. An exemplary configuration of a printing device is further described infra with reference to FIG. 5C.

The network 109 can be a local area network, a wide area network or any type of network such as an intranet, an extranet (for example, to provide controlled access to external users, for example through the Internet), the Internet, etc., or a combination thereof. Further, other communications links (such as a virtual private network, a wireless link, etc.) may be used as well for the network 109. In addition, the network 109 preferably uses TCP/IP (Transmission Control Protocol/Internet Protocol), but other protocols such as SNMP (Simple Network Management Protocol) and HTTP (Hypertext Transfer Protocol) can also be used. How devices can connect to and communicate over networks is well-known in the art and is discussed for example, in "How Networks Work", by Frank J. Derfler, Jr. and Les Freed (Que Corporation 2000) and "How Computers Work", by Ron White, (Que Corporation 1999), the entire contents of each of which are incorporated herein by reference. Although the printing devices 103-105 depicted in FIG. 1 are shown as being connected to one or more networks, the aspects of this disclosure may be applied to a system for managing a device that is not connected to a network but utilizes instead point-to-point communication, such as radio-frequency identification (REID) technology. Such technology is well-known in the art and a description thereof is omitted in the interest of brevity.

Figure 2:
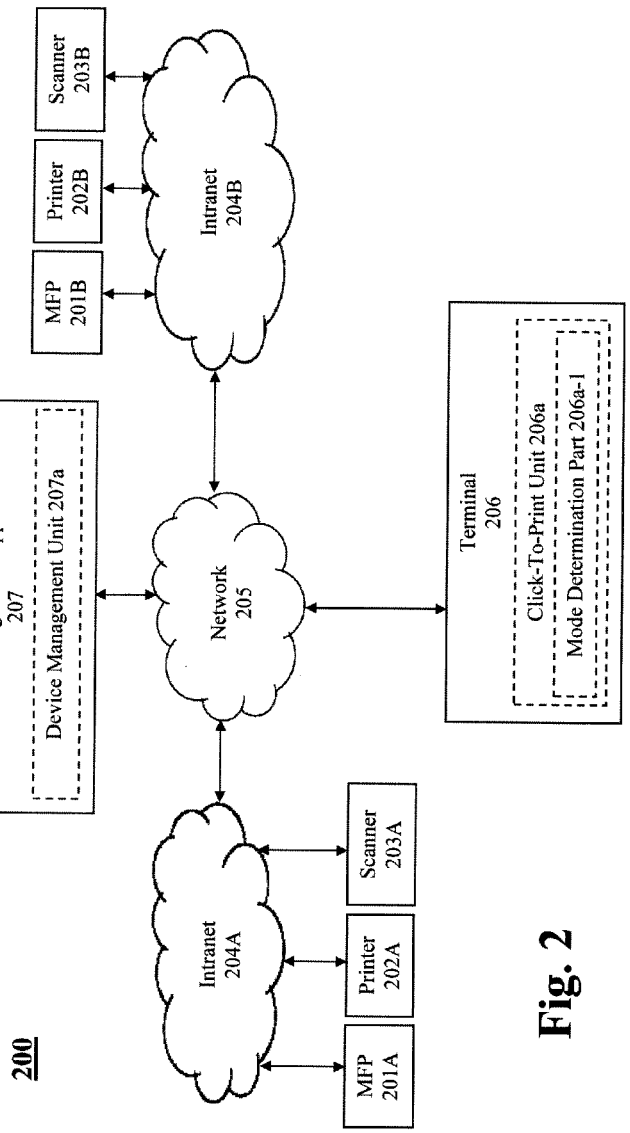
FIG. 2 shows a block diagram of a system for managing a plurality of network-connected devices, according to another exemplary embodiment.

With reference to FIG. 2, a system for managing user printing in a network environment, according to another exemplary embodiment, is described below.

The example of FIG. 2 includes a system 200 which includes an MFP 201A, a printer 202A and a scanner 203A, all of which are interconnected by an intranet 204A (collectively "Network A"); an MFP 201B, a printer 202B and a scanner 203B, all of which are interconnected by an intranet 204B (collectively "Network B"); and a terminal 206 and a device management apparatus 207 (including a device management unit 207a), which are interconnected by a network 205. The network 205 is connected to the intranets 204A and 204B. For example, each of the Networks A and B respectively connected by the intranets 204A and 204B may represent a regional office of a global/national enterprise having multiple regional offices. The terminal 206 includes a click-to-print unit 206a (such as a printer selection program executing on the terminal) which includes a mode determination part 206a-1. Hereinafter, in this disclosure, the terms "click-to-print unit" and "printer selection program" are used interchangeably.

In the example of FIG. 2, the device management unit 207a of the device management apparatus 207 collects device data from the various devices in the Networks A and B. In addition, the mode determination part 206a-1 which determines whether the intercepted print job is to be processed in a job-specific selection mode or a silent mode. In a case that the mode determination part 206a-1 determines that the intercepted print job is to be processed in the job-specific selection mode, the user interface part causes the printer selection user interface to be displayed to the user, based on the group of printers extracted by the printer group extraction part, to receive user selection of a printer amongst the group of printers, and the print job submission part causes the print job to be transmitted to the user-selected printer. On the other hand, in a case that the mode determination part 206a-1 determines that the intercepted print job is to be processed in the silent mode, the print job submission part causes the user-submitted print job to be transmitted to a previously specified printer.

Otherwise, operations of the elements of the system 200 are similar to those discussed in connection with the corresponding elements of the system 100 of FIG. 1.

Figure 3:
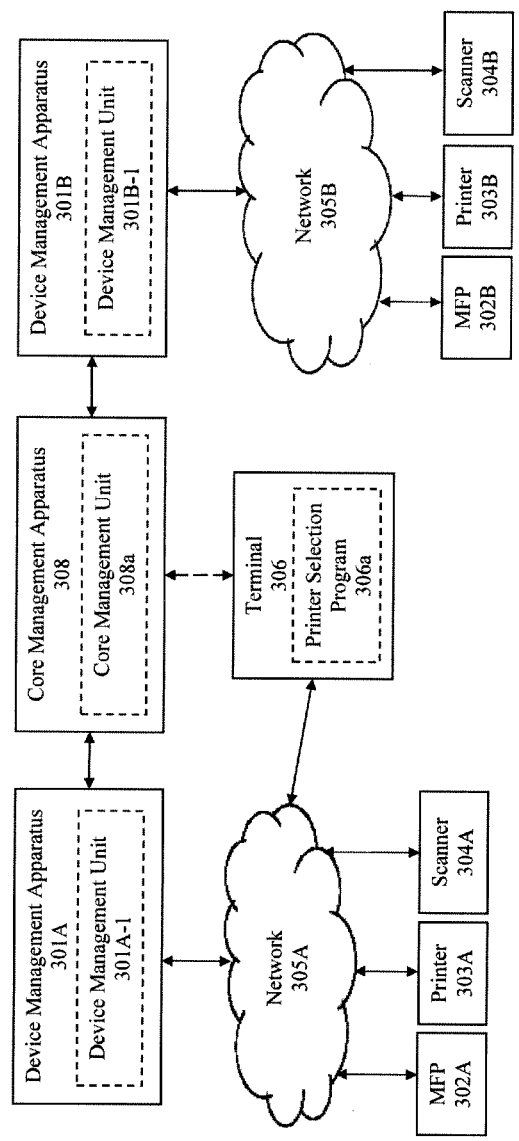
FIG. 3 shows a block diagram of a system for managing a plurality of network-connected devices, according to another exemplary embodiment.

With reference to FIG. 3, a system for managing user printing in a network environment, according to another exemplary embodiment, is described below.

The example of FIG. 3 includes a system 300 which includes a device management apparatus 301A including a device management unit 301A-1, an MFP 302A, a printer 303A, a scanner 304A and a terminal 306, all of which are interconnected by a network 305A (collectively "Network A"); a device management apparatus 301B including a device management unit 301B-1, an MFP 302B, a printer 303B and a scanner 304B, all of which are interconnected by a network 305B (collectively "Network B"); and a core management apparatus 308 including a core management unit 308a, which is connected to the device management apparatuses 301A and 301B.

In addition, the user at the terminal 306 may be able to access the devices in Network B via the core management apparatus 308. For example, when the user at the terminal 306 submits a print request, the device management apparatus 301A may request device data of all the printing devices in Networks A and B (or any other networks managed by the core management apparatus 308) from the core management apparatus 308. Such device data may be provided to the printer selection program 306a, and the printer selection program 306a may extract and display a list of printers to the user at the terminal 306 for user selection. Further, in another embodiment, the printer selection program 306a may be configured to communicate (directly or indirectly) with, and receive the device data from, the core management apparatus 308.

The core management unit 308a and/or the device management units 301A-1 and 301B-1 may be realized by a computer program product including a computer-usable, non-transient medium (such as a disk storage apparatus) having instructions tangibly embodied therein that are executed by a computer. Thus, it should be understood that the core management unit 308a and/or the device management units 301A-1 and 3015-1 may be executed on a computer. While the core management unit 308a and/or the device management units 301A-1 and 3015-1 are shown as being external to the network devices, the core management unit 308a and/or the device management units 301A-1 and 301B-1 may in fact be executed on a client terminal and/or network device.

The core management apparatus 308 and/or the device management apparatuses 301 may include a data store that can comprise one or more structural or functional parts that have or support a storage function. For example, the data store can be, or can be a component of, a source of electronic data, such as a document access apparatus, a backend server connected to a document access apparatus, an e-mail server, a file server, a multi-function peripheral device (MFP or MFD), a voice data server, an application server, a computer, a network apparatus, a terminal etc. It should be appreciated that the term "electronic document" or "electronic data", as used herein, in its broadest sense, can comprise any data that a user may wish to access, retrieve, review, etc.

The system 300 is not limited to the configuration shown in FIG. 3, and the core management apparatus 308 may be connected to any arbitrary number of device management apparatuses 301 and other devices.

Otherwise, operations of the elements of the system 300 are similar to those discussed in connection with the corresponding elements of the system 100 of FIG. 1.

With reference to FIGS. 4A-4D, data stored and maintained in the system 100 according to an exemplary embodiment are illustrated.

An example of device data collected by the device management unit 101a from the printing devices 103-105 is illustrated in FIG. 4A. As seen in FIG. 4A, the device data for each printing device may include a variety of attributes such as name, manufacturer, IP address, serial number, status, error/warning, firmware version and department. The information depicted in FIG. 4A is merely exemplary, and other device information, device properties, device configuration information, and so forth, may be included in the device data collected by the device management unit 101a. As non-limiting examples, the device data may include one or more of the following for a given network device: device manufacturer; device model; device serial number; device type (printer, scanner, terminal, etc.); device location (physical address, geographic address, network address, IP address, MAC address, etc.); output technology (e.g., laser, inkjet, solid ink, thermal, other technology, etc.); device location type (e.g., production/copy center, in a specific workgroup area, etc.); scope (e.g., within the scope of administrative responsibility of a particular IT administrator, outside the scope of administrative responsibility of particular IT administrator, etc.); connection type (e.g., network connected, workstation/local connected, non-connected, etc.); functions (e.g., copy, fax, print, scan, copy/scan, copy/fax, copy/print, print/fax, print/scan, copy/print/fax, copy/print/scan, copy/print/fax/scan, etc.); firmware version (e.g., major version, minor version, etc.); installed applications (e.g., application name, major version, etc.); organization (e.g., different groups, subgroups, levels, departments, divisions and so forth within a larger enterprise or institutional entity, such as management group, sales group, marketing group, research & development group, etc.); supply level (e.g., consumable types such as paper and toner >empty/low/ok, etc.); capability (e.g., color, economy color, monochrome only, color scan, duplex, A3, not A3, etc.); last status update (e.g., 10 minutes, 60 minutes, 6 hours, etc.); duplex usage (e.g., 2:1, 1:2, 2:2, Book Duplex, etc.); paper size usage (e.g., A3, A4, 134, etc.); pages per job (e.g., 1, 2, 6-10, etc.); pages per minute (PPM) range (e.g., 1-20 ppm, 41+ ppm, etc.); color technology (e.g., professional color, convenience color, etc.); audit results/analysis (e.g., devices which satisfied a particular audit or test, devices which did not satisfy a particular audit or test, etc.); and so forth.

The device data collected by the device management unit 101a may also include error history information that includes a log of all errors occurring at the corresponding managed device, and usage history information indicating which users have the utilized the managed device and when such use has occurred. The usage history information may indicate, for example, a number of total impressions (e.g. pages) produced by a user, or a number of specific types of impressions (copy color, copy BW, print color, print BW, etc.) produced by a user.

The device management unit 101a communicates with one or more of the plurality of printing devices to collect and obtain the various device data corresponding to each device. Many printers and other devices store data indicating their attributes or properties in a Management Information Base (MIB). The MIB may conform with the SNMP (Simple Network Management Protocol) protocol, and properties information can be obtained directly from the MIB through SNMP queries. In this way, the device management unit 101a is configured to discover and/or poll the corresponding plurality of network devices to obtain the device data from the network devices.

The device management unit 101a may obtain the device data (such as the name, status, configuration information, error history, usage history, etc.) from each network device by monitoring a network to which the device is connected (i.e. network 109), and detecting and receiving one or more alert notifications or status updates transmitted to the network from any of the plurality of network devices (e.g. printing devices 103-105). For example, the device management unit 101a may receive the status updates by repeatedly transmitting requests to the printing devices 103-105 via the network 109, inquiring as to the status of each device. In response, each device may transmit status updates back to the device management unit 101a, wherein each status update indicates the device name, status, configuration information, error history, usage history, whether an error exists or has occurred at the network device, etc. Alternatively, each network device may automatically transmit status updates to the device management unit 101a (without waiting for requests or queries from the device management unit 101a), at regular intervals or whenever an error occurs at the network device. The device management apparatus 101 may include locally resident hardware and/or software agents installed locally on each of the printing devices 103-105, which are configured to transmit the status updates directly to the device management unit 101a. The device data may be stored along with other data in a data store external to the device management apparatus 101, or alternatively, in the storage unit 101b resident in the device management apparatus 101 and retrieved as needed.

Other information that may be stored in the system 100 (e.g. by the device management apparatus unit 101a or the printer selection program 102c-1) includes printer location information, as shown in FIG. 4B. The printer location information of FIG. 4B includes a device ID, IP address and location information for each device. In another exemplary embodiment, the location information may be represented by other systems such as GPS coordinates, etc.

In addition, user access information such as shown in FIG. 4C may also be stored in the system 100. Such user access information may include a device ID, IP address and user access information for each device. In the example of FIG. 4C, the user access information indicates, for each specific device, the users (or group of users) who have access to the specific device.

FIG. 4D shows sample configuration item information maintained, for example, by the printer selection program 102c-1, according to an exemplary embodiment. In the example of FIG. 4D, each configuration item included in the configuration item information has an item ID (e.g. "1"), an item name (e.g. "CurrentPrinterAddress") and an item value (e.g. "192.15.201.102"). For example, the value of the configuration item "CurrentPrinterAddress" indicates the network address of the printer currently selected by the user. Similarly, "Silent" indicates whether the printer selection UI is to be displayed to the user when the user submits a print request (e.g. set to print without displaying the print selection UI); "ServerAddress" indicates the network address of the device management unit (e.g. device management unit 101a of FIG. 1); "CacheExpire" indicates the length of time (e.g. in minutes) to cache the browse/nearby data from the device management unit; "NearbyBits" indicates how many subnet levels are to be displayed when the "nearby" button (e.g. shown in FIG. 8A) is activated (e.g. set to 8 to display a Class C subnet, 16 to display a Class B subnet, etc.); "HideNearby" indicates whether to hide the "nearby" button on the printer selection UI (e.g. set to 1 to hide); "HideFavorites" indicates whether to hide the "favorites" button on the printer selection UI (e.g. set to 1 to hide); "HideBrowse" indicates whether to hide the "browse" button on the printer selection UI (e.g. set to 1 to hide); "HideFilter" indicates whether to hide the "filter" button on the printer selection UI (e.g. set to 1 to hide); "HideMap" indicates whether to hide the "View Map" button on the printer selection UI (e.g. set to 1 to hide); and "Favorites" indicates the list of printers saved by the user as "favorite". The list of printers is specific to the particular terminal apparatus and the identity of the user (e.g. user ID). For example, the list of printers stored for the user on his or her work computer may be different from the list of printers stored for the same user on his or her home computer. Further, "CurrentFilter" includes the specification of a currently selected filter (e.g. "custom_1" including a set of columns and corresponding values), "Fields" includes a comma-separated set of field names to be displayed in the printer list (e.g. "fields.csv"), and "Categories" includes a comma-separated set of categories to be displayed (e.g. "categories.csv").

The information (such as shown in FIGS. 4A-4D) collected and/or stored in the system 100 is not limited to those discussed in the present disclosure, and may include other information relevant to providing document management services. Such information can be stored in an internal storage resident in the document management apparatus 101 and/or the terminal 102. Alternatively, the information can be stored externally in a storage unit connected to the document management apparatus 101 and/or the terminal 102, or accessible via the network 109, and retrieved as needed. For example, the information may be stored in one or more databases [e.g. off-the-shelf database applications based on SQL (Structured Query Language), or other customized database applications with search/query function]. If the information is stored in more than one location, the information may be synced, for example, periodically or upon a user request.

Figure 5A:
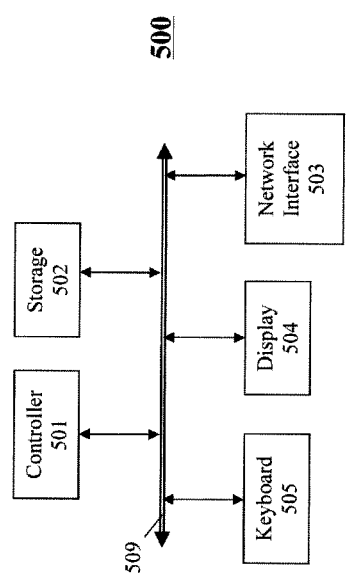
FIG. 5A shows a block diagram of an exemplary configuration of a device management apparatus, such as illustrated in FIGS. 1-3.

FIG. 5A shows an exemplary configuration of a computing device that can be configured (for example, through software) to operate (at least in part) as the core management apparatus 308 of FIG. 3 and/or device management apparatuses 401 illustrated in FIG. 3. As shown in FIG. 5A, the management unit 500 includes a controller (or central processing unit) 501 that communicates with a number of other components, including memory or storage part 502, network interface 503, display 504 and keyboard 505, by way of a system bus 509.

The management unit 500 may be a special-purpose device (such as including one or more application specific integrated circuits or an appropriate network of conventional component circuits) or it may be software-configured on a conventional personal computer or computer workstation with sufficient memory, processing and communication capabilities to operate as a terminal and/or server, as will be appreciated to those skilled in the relevant arts.

In the management unit 500, the controller 501 executes program code instructions that control device operations. The controller 501, memory/storage 502, network interface 503, display 504 and keyboard 505 are conventional, and therefore in order to avoid occluding the inventive aspects of this disclosure, such conventional aspects will not be discussed in detail herein.

The management unit 500 includes the network interface 503 for communications through a network, such as communications through the network 109 with the printing devices 103-105 in FIG. 1. However, it should be appreciated that the subject matter of this disclosure is not limited to such configuration. For example, the management unit 500 may communicate with client terminals through direct connections and/or through a network to which some components are not connected. As another example, the management unit 500 does not need to be provided by a server that services terminals, but rather may communicate with the devices on a peer basis, or in another fashion.

The core management unit and/or the device management units of the present disclosure are not limited to a server or computer, but can be manifested in any of various devices that can be configured to communicate over a network and/or the Internet.

Figure 5B:
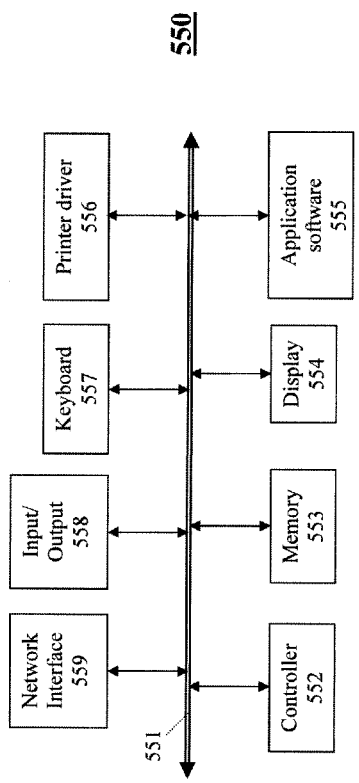
FIG. 5B shows a block diagram of an exemplary configuration of a terminal, such as illustrated in FIGS. 1-3.

An example of a configuration of the terminal 102 of FIG. 1 and/or other terminals described in the present disclosure (for example, as a computer) is shown schematically in FIG. 5B. In FIG. 5B, computer 550 includes a controller (or central processing unit) 552 that communicates with a number of other components, including memory 553, display 554, keyboard (and/or keypad) 557, other input/output (such as mouse, touchpad, stylus, microphone and/or speaker with voice/speech interface and/or recognition software, etc.) 558, network interface 559, print driver 556 and application software 555, by way of an internal bus 551.

The memory 553 can provide storage for program and data, and may include a combination of assorted conventional storage devices such as buffers, registers and memories [for example, read-only memory (ROM), programmable ROM (PROM), erasable PROM (EPROM), electrically erasable PROM (EEPROM), static random access memory (SRAM), dynamic random access memory (DRAM), non-volatile random access memory (NOVRAM), etc.].

The network interface 559 provides a connection (for example, by way of an Ethernet connection or other network connection which supports any desired network protocol such as, but not limited to TCP/IP, IPX, IPX/SPX, or Net-BEUI) to the network to which the computer 550 is connected (e.g. network 109 of FIG. 1).

Print driver 556 and application software 555 are shown as components connected to the internal bus 551, but in practice are typically stored in storage media such as a hard disk or portable media, and/or received through the network, and loaded into memory 553 as the need arises.

Depending on the type of the particular terminal device, one or more of the components shown in FIG. 5B may be missing. For example, a particular mobile phone may be missing the print driver 556 and the keyboard 557.

Additional aspects or components of the computer 550 are conventional (unless otherwise discussed herein), and in the interest of clarity and brevity are not discussed in detail herein. Such aspects and components are discussed, for example, in "How Computers Work", by Ron White (Que Corporation 1999), and "How Networks Work", by Frank J. Derfler, Jr. and Les Freed (Que Corporation 2000), the entire contents of each of which are incorporated herein by reference.

Figure 5C:
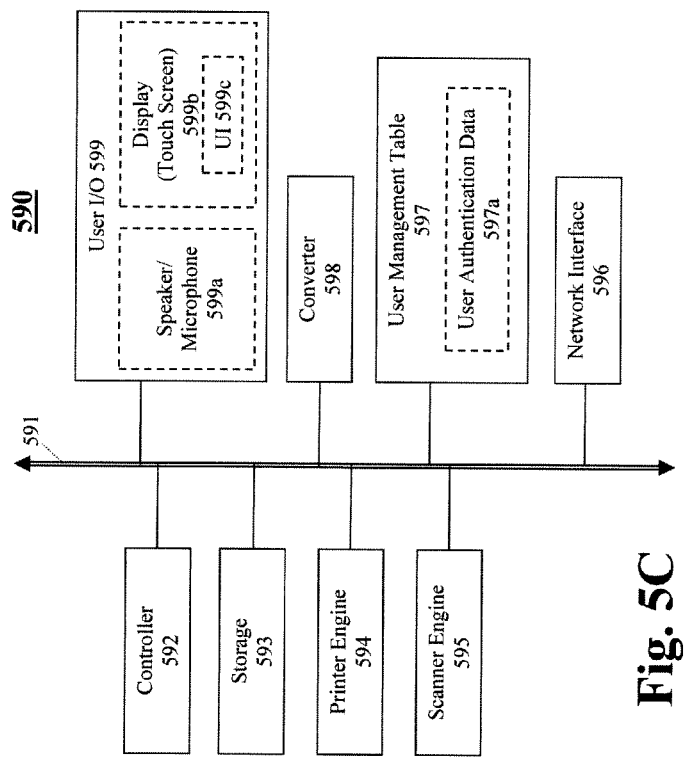
FIG. 5C shows a block diagram of an exemplary configuration of a multi-function device, such as illustrated in FIGS. 2 and 3.

FIG. 5C shows a schematic diagram of a configuration of a network-connected device as an MFD, according to an exemplary embodiment, which can be any apparatus (including a microprocessor chip or a collection of devices having varying degree of integration) that has the ability to perform two or more functionalities.

The MFD 590 shown in FIG. 5C includes a controller 592, and various elements connected to the controller 592 by an internal bus 591. The controller 592 controls and monitors operations of the MFD 590. The elements connected to the controller 592 include storage 593 (for example, random access memory, read-only memory, hard disk drive, portable storage media drive such as for optical discs, magnetic discs, magneto-optical discs, etc., semiconductor memory cards, combinations of storage media, etc.), printer engine 594, scanner engine 595, network interface (I/F) 596, converter 598 for converting data from one format to another format (for example, a format suitable for printing, faxing, e-mailing, etc.), and user I/O (Input/Output) 599. The controller 592 also utilizes information stored in user management table 597 to authenticate the user and control user access to the functionalities of the MFD 590.

Storage 593 can include one or more storage parts or devices [e.g. a read only memory (for example, ROM, PROM, EPROM, EEPROM, etc.), a random access memory (RAM), a hard disk drive (HOD), portable media (for example, floppy disk, optical disc, magnetic discs, magneto-optical discs, semiconductor memory cards, etc.) drives], and program code instructions can be stored in one or more parts or devices of storage 593 and executed by the controller 592 to carry out the instructions. Such instructions can include instructions for performing specified functions (such as printing, scanning, faxing, copying, e-mailing, etc.) of the MFD 590, to enable the MFD 590 to interact with a terminal, as well as perhaps other external devices, through the network interface 596, and to control the converter 598, access data in the user management table 597, and interactions with users through the user I/O 599.

The network interface 596 is utilized by the MFD 590 to communicate with other network devices such as a terminal or a device management apparatus (e.g., device management apparatus 101 of FIG. 1) and receive data requests, print jobs, user interfaces, and etc.

The user I/I 599 includes one or more display screens 599b that display, under control of controller 592, information allowing the user of the MFD 590 to interact with the MFD 590, The display screen 599b can be any of various conventional displays (such as a liquid crystal display, a plasma display device, a cathode ray tube display, etc.), but preferably is equipped with a touch sensitive display (for example, liquid crystal display) and is configured to provide a GUI (graphical user interface) 599c based on information input by an operator of the MFD 590, so as to allow the operator to interact conveniently with services provided on the MFD 590, or with the MFD 590 serving as terminal for accessing electronic data or other content through the network. User interfaces or other contents received through the network via the network interface 596 can be displayed on the display screen 599h.

The display screen 599b does not need to be integral with, or embedded in, a housing of the MFD 590, but may simply be coupled to the MFD 590 by either a wire or a wireless connection. The user I/O 599 may include keys and/or buttons (such as graphical keys or buttons, or other graphical elements, of a GUI on a touchscreen display) for inputting information or requesting various operations. Alternatively, the user I/O 599 and the display screen 599b may be operated by a keyboard, a mouse, a remote control, voice recognition (e.g., through a speaker/microphone 599a), or eye-movement tracking, or a combination thereof.

Printer engine 594, scanner engine 595 and network interface 596 are otherwise conventional, and therefore, a detailed description of such conventional aspects is omitted in the interest of clarity and brevity.

The MFD 590 can have any or all of the functions of similar devices conventionally known, such as for scanning, editing and storing images, sending a fax, sending and receiving e-mails with or without attachments, accessing files by FTP or another protocol or facility, surfing the Web, etc. Further, multi-functional devices or multi-function peripheral devices can play a prominent role to convert hardcopy documents to electronic documents.

As discussed above, the MFD 590 may also operate as a device management apparatus (e.g. device management apparatus 101 of FIG. 1). The operation of such device management apparatus according to an exemplary embodiment is described supra with reference to FIG. 1.

Figure 6:
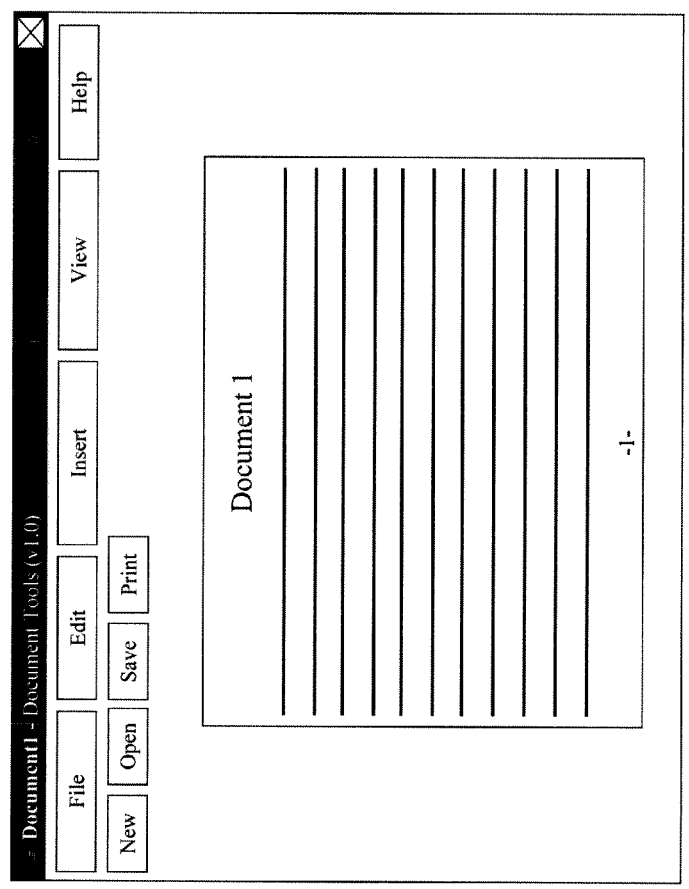
FIG. 6 shows a sample screenshot of a user application, according to an exemplary embodiment.

FIG. 6 shows a screenshot of a word processing application for allowing the user at a terminal apparatus to create, modify and print documents. As shown in FIG. 6, such word processing application has various functionalities that the user may access via the buttons at the top of the screen (e.g. "file" for creating, opening and saving documents, "edit" for editing the document, "insert" for inserting objects into the document, "view" for viewing various tools, and "help" for obtaining additional information). There may be provided shortcuts to frequently used functionalities such as printing a document (in the example of FIG. 6, the buttons "new", "open", "save" and "print" are provided).

Figure 7:
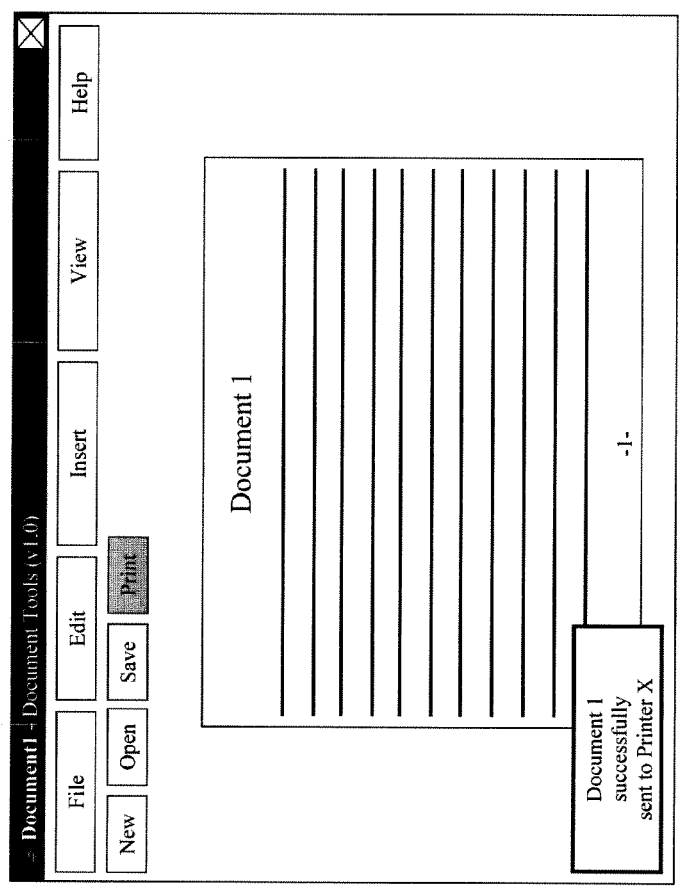
FIG. 7 shows a sample screenshot of a user application after the user has requested printing, according to an exemplary embodiment.

If the user activates the "print" button in FIG. 6, in an exemplary embodiment, the document may be sent directly to a predetermined printer without further prompting the user. As shown in FIG. 7, in such embodiment, a message may be displayed to the user, indicating that the document was successfully sent to the predetermined printer.

Figure 8A:
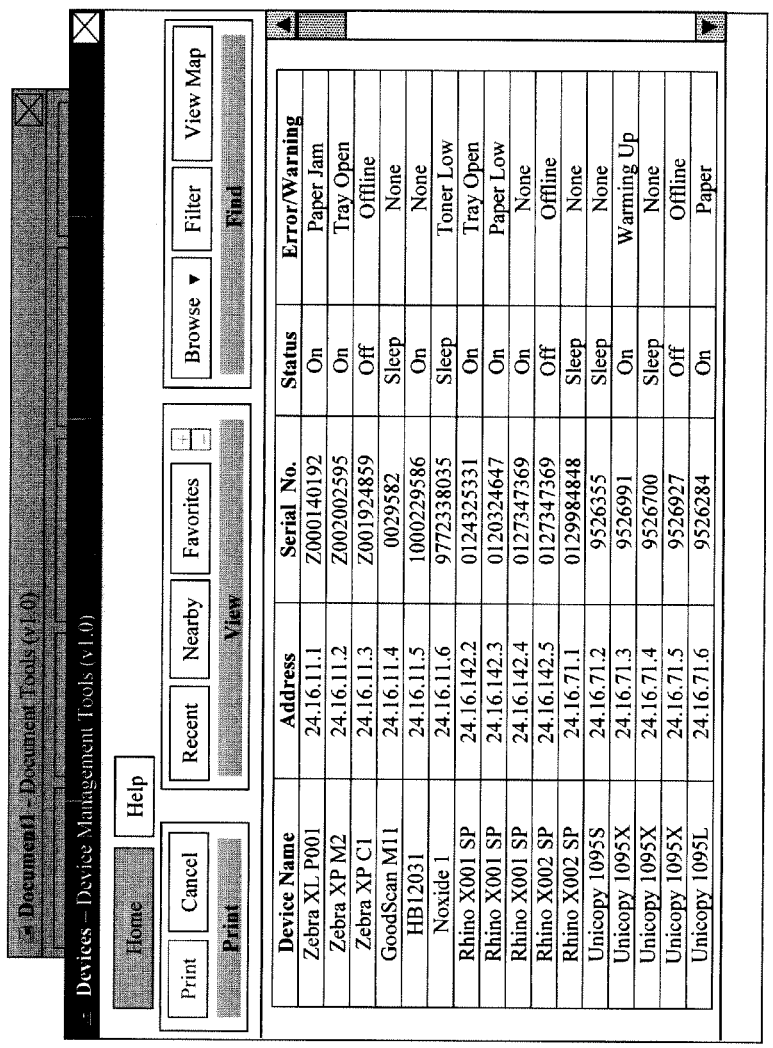
FIGS. 8A-8D show sample screenshots of a printer selection user interface (UI), according to an exemplary embodiment.

On the other hand, in another exemplary embodiment, a printer selection user interface (UI) may be displayed to the user, as shown in FIG. 8A, to permit the user to specify a printer to which the document should be sent. In the example of FIG. 8A, three categories ("print", "view" and "find") of buttons are displayed at the top of the screen. The "print" category includes a "print" button for printing from a selected printer and a "cancel" button for canceling the print job. The "view" category includes a "recent" button for displaying a list of printers that have recently been used by the user, a "nearby" button for displaying a list of printers that are nearby from the user's location, and a "favorites" button for displaying the user's previously saved favorite printers. The "find" category includes a "browse" button for displaying a list of printers using a selection tree, a "filter" button for providing a filter for narrowing down the list of printers displayed to the user, and a "view map" button for displaying a map indicating the location of available printers.

Figure 8B:
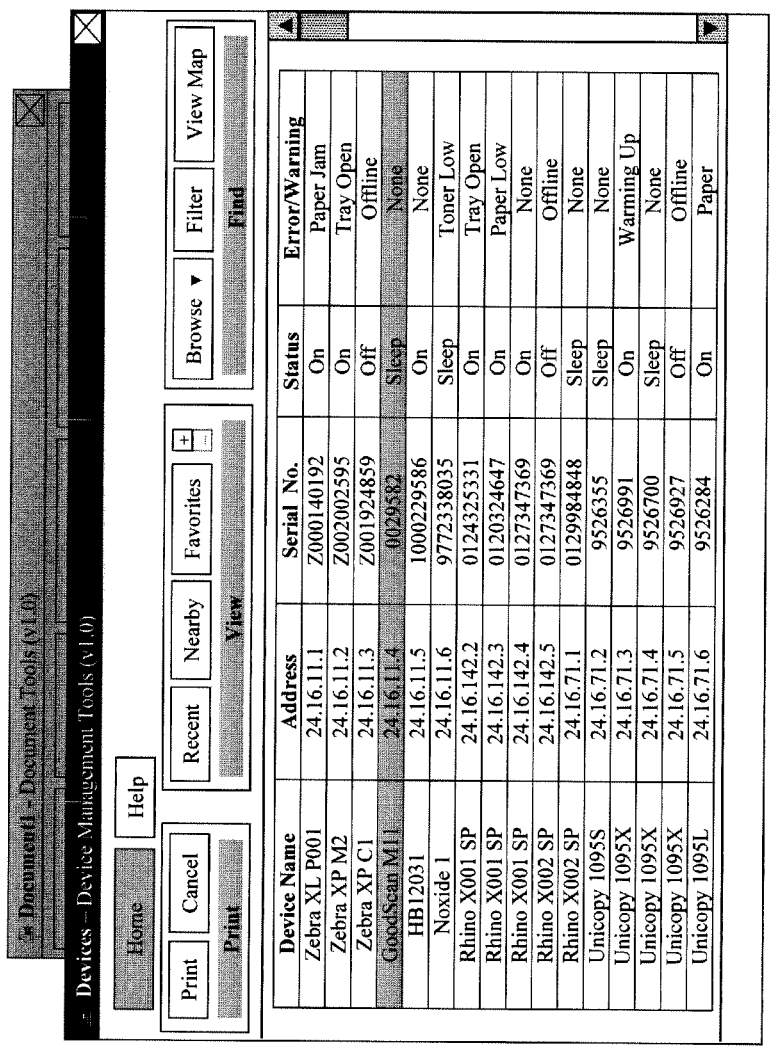

FIG. 8B shows the screen in which the user has selected a printer. As shown in FIG. 8B, the "print" button and the "+" button have become enabled.

Figure 8C:
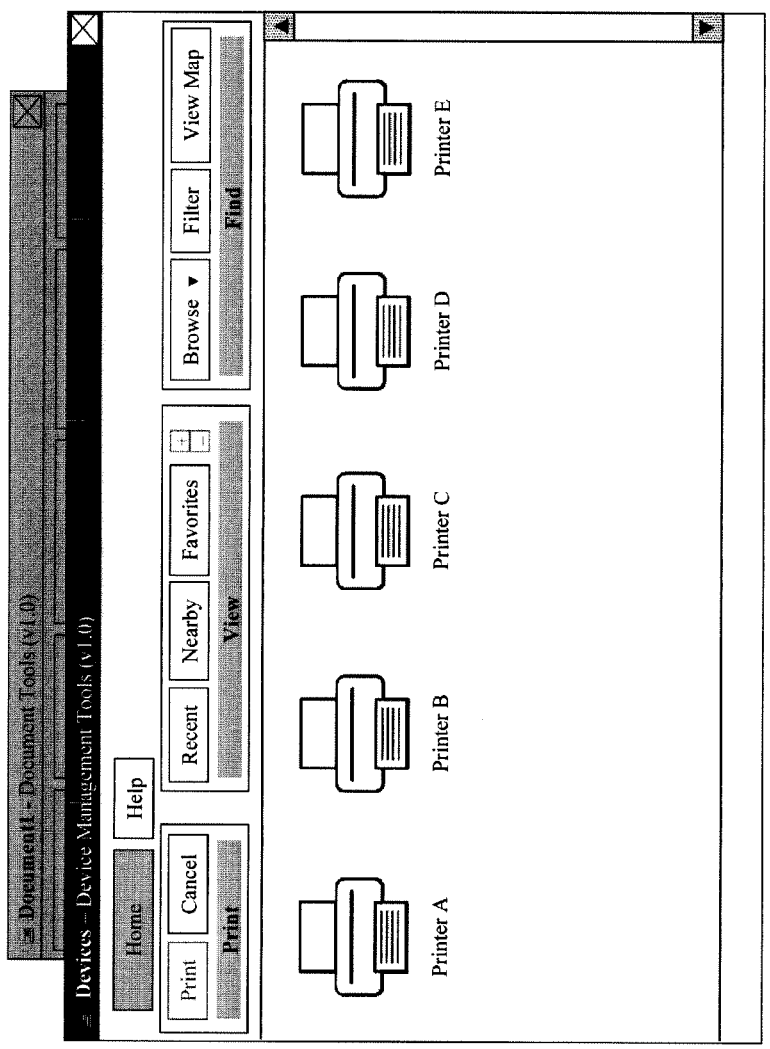
Figure 8D:
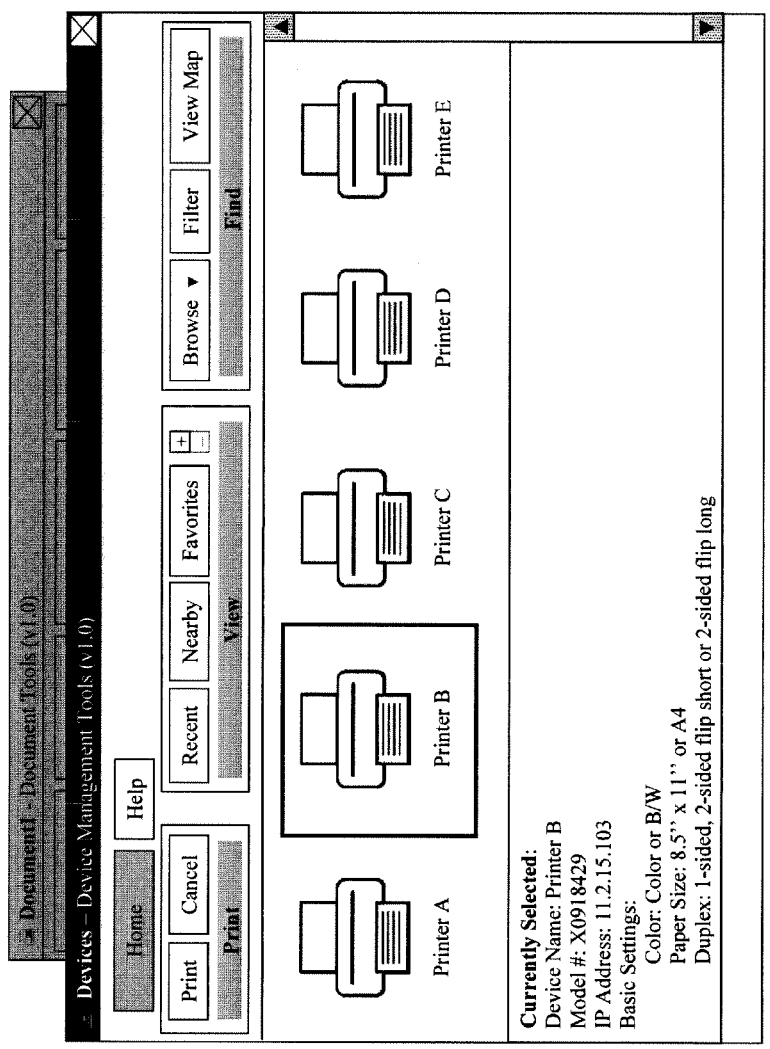

In the examples of FIGS. 8C and 8D, the printers are displayed in an icon view format.

Figure 9:
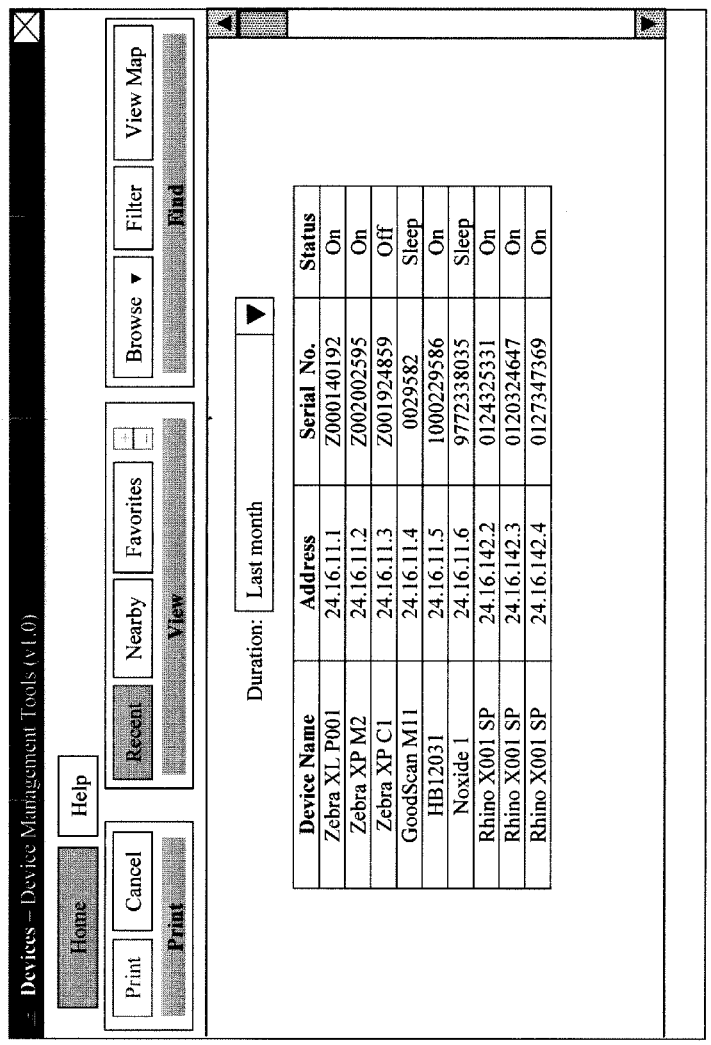
FIG. 9 shows a sample screenshot of a printer selection UI, according to an exemplary embodiment.

FIG. 9 shows an example in which the user has activated the "recent" button. As shown in FIG. 9, the user can specify the duration for which to display the printers (e.g. "last month").

Figure 10:
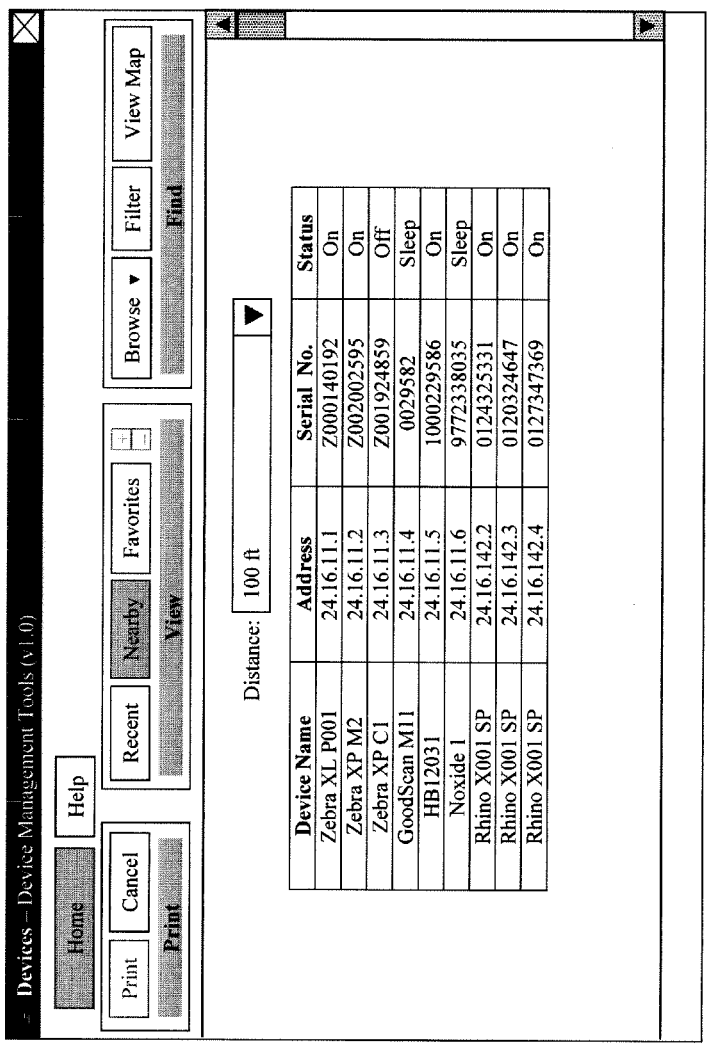
FIG. 10 shows a sample screenshot of a printer selection UI, according to an exemplary embodiment.

FIG. 10 shows an example in which the user has activated the "nearby" button. As shown in FIG. 10, the user can specify the distance which qualifies as being "nearby" (e.g. 100 ft).

Figure 11:
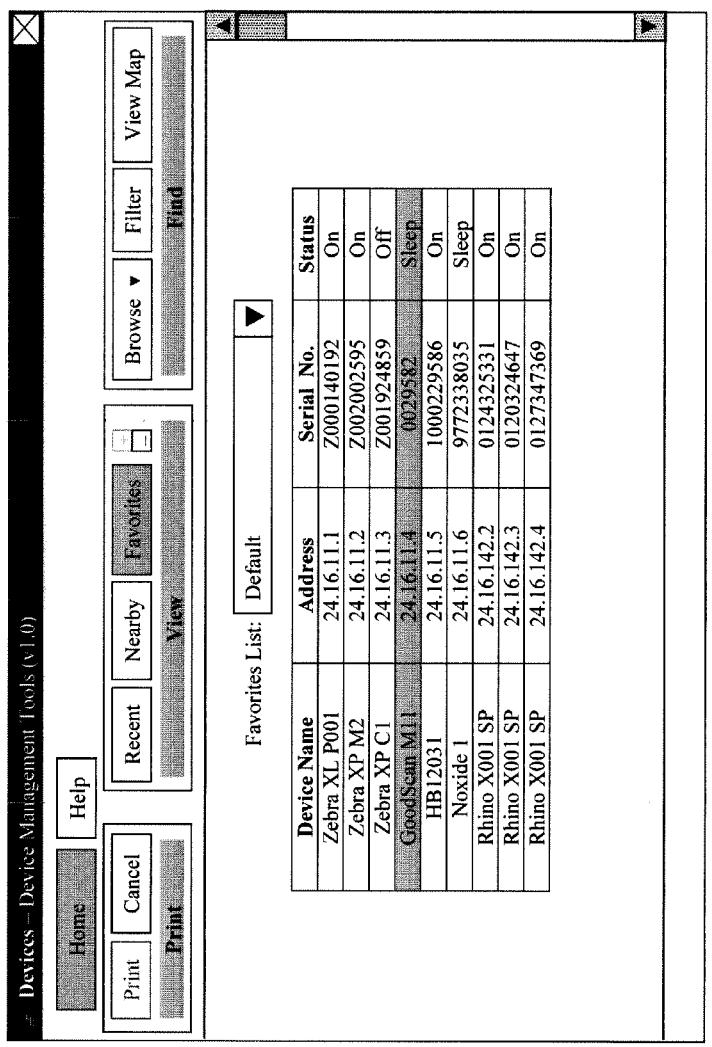
FIG. 11 shows a sample screenshot of a printer selection UI, according to an exemplary embodiment.

FIG. 11 shows an example in which the user has activated the "favorites" button. As shown in FIG. 11, the user can maintain numerous favorite lists. When a printer on the list of the user's favorite list is selected, the "−" button becomes enabled. Activating the "−" button removes the selected printer from the user's favorite list.

Figure 12A:
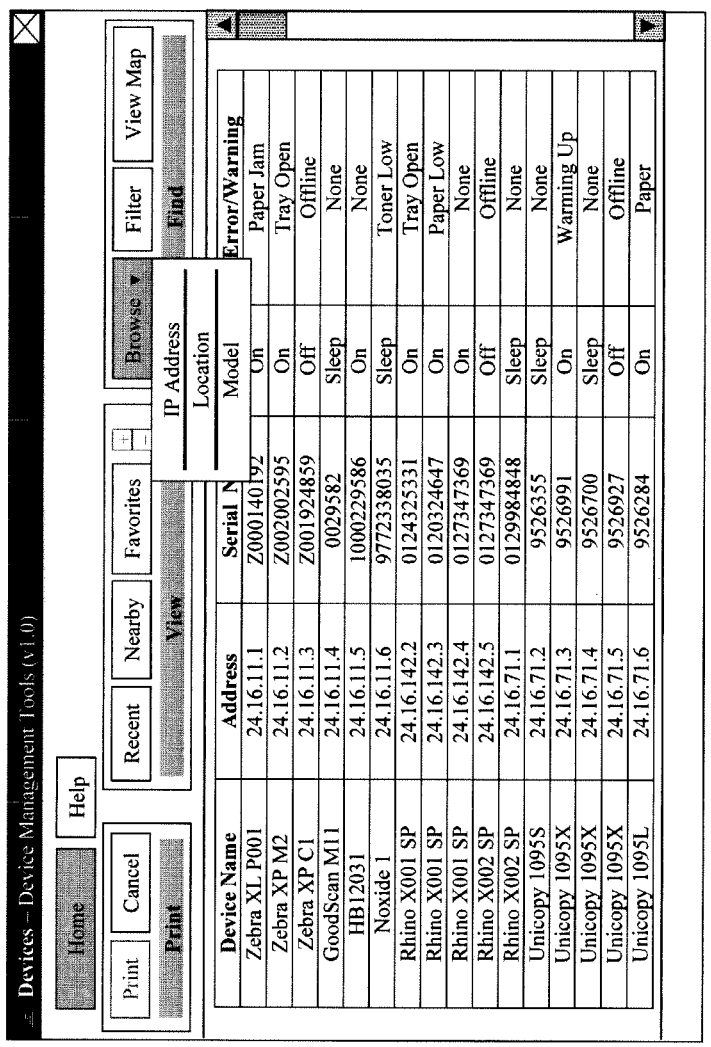
Figure 12C:
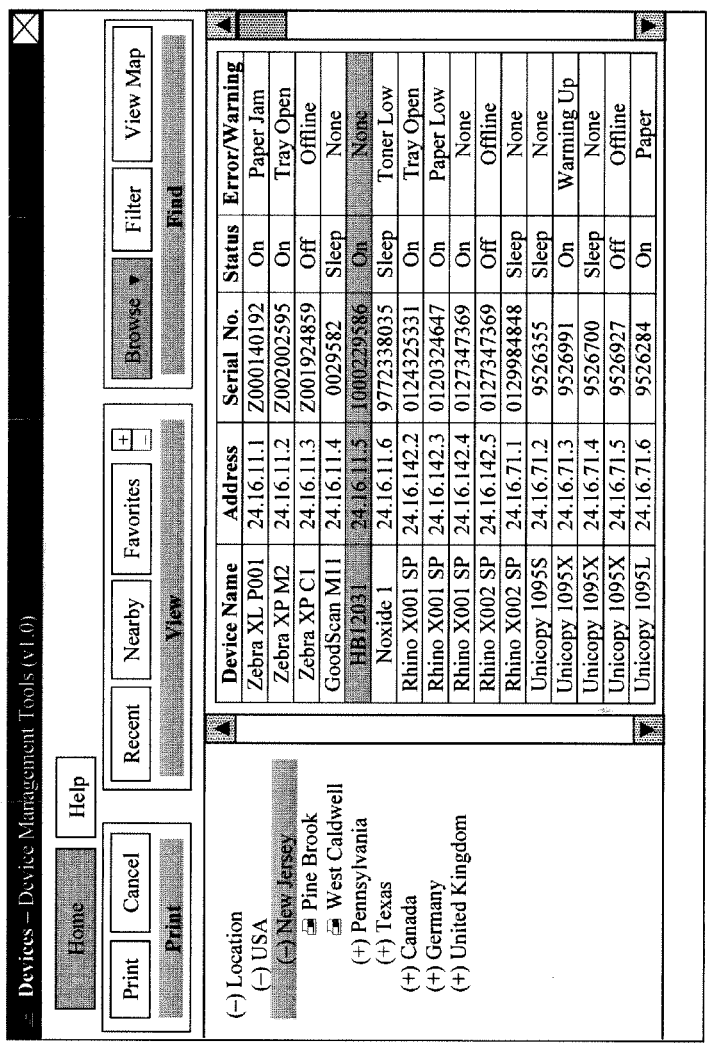
Figure 12D:
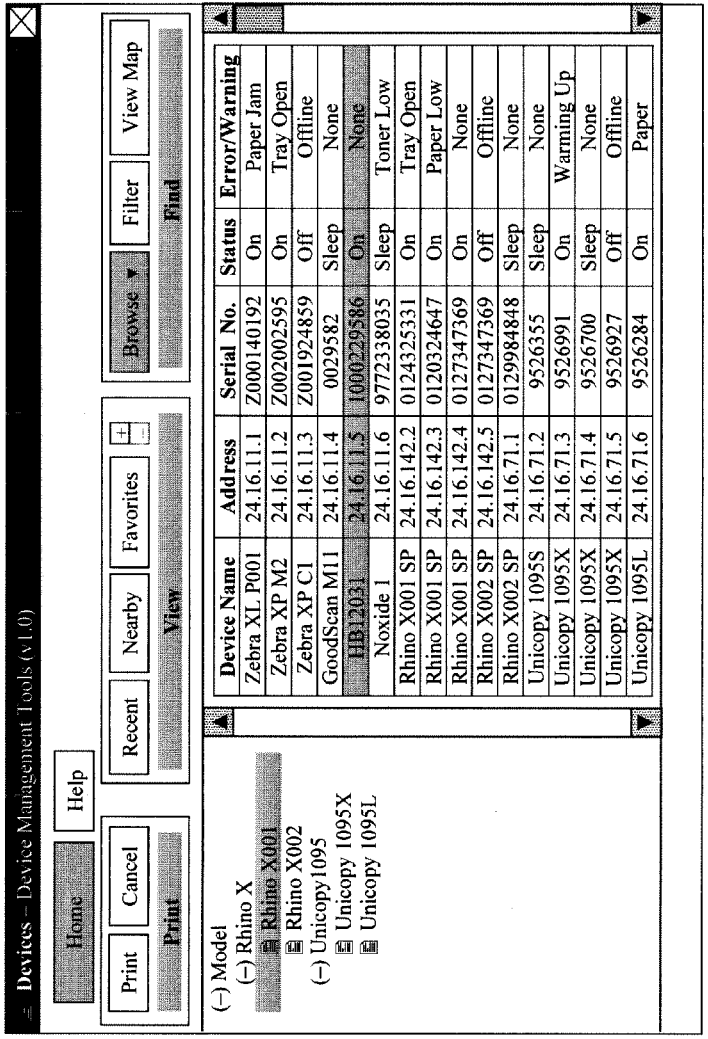

FIG. 12A shows an example in which the user has activated the "browse" button. As shown in FIG. 12A, when the user activates the "browse" button, a list of categories are displayed in a drop-down menu. In the example of FIG. 12A, such list includes "IP address", "location" and "model". When the user selects "IP Address" for example, a screen shown in FIG. 12B is displayed to the user. Using the panel displayed on the left side of the screen, the user can navigate through the plurality of printers available to the user to select the printer he or she wishes to print from. If the user selects "location", a screen shown in FIG. 12C is displayed to the user. Similarly, if the user selects "model", a screen shown in FIG. 12D is displayed to the user.

Figure 13:
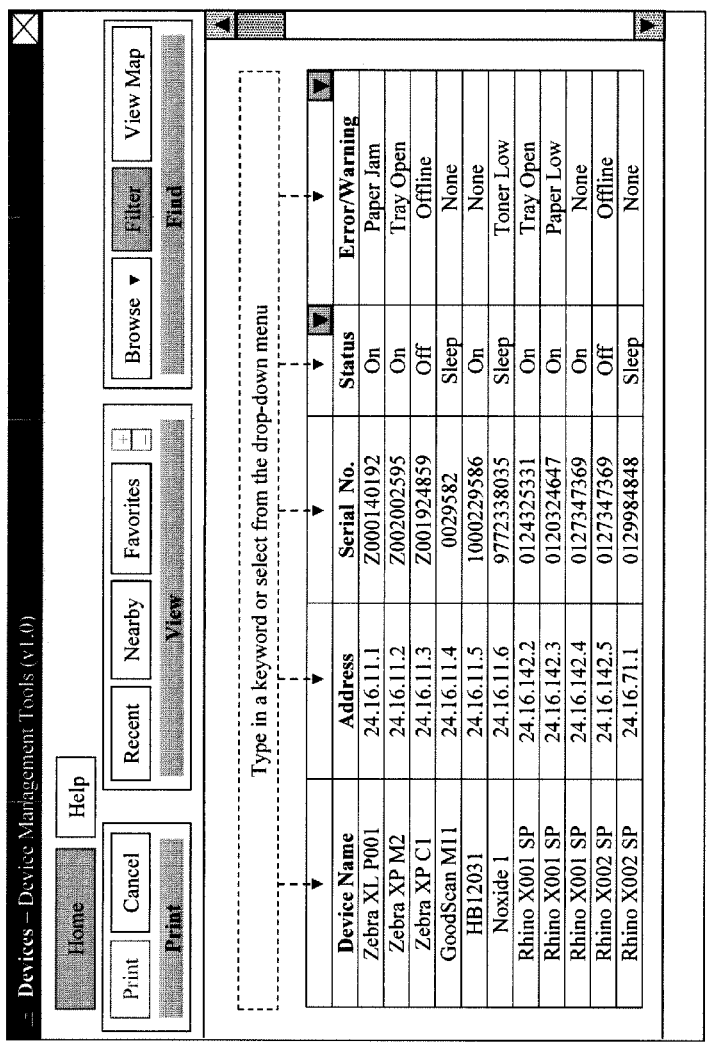
FIG. 13 shows a sample screenshot of a printer selection UI, according to an exemplary embodiment.

FIG. 13 shows an example in which the user has activated the "filter" button. As shown in FIG. 13, each column (i.e. field) gets its own filter for permitting the user to specify a filter value. When the user specifies the filter value for a specific column, only those printers having a value matching the filter value for the specific column are displayed to the user.

Figure 14A:
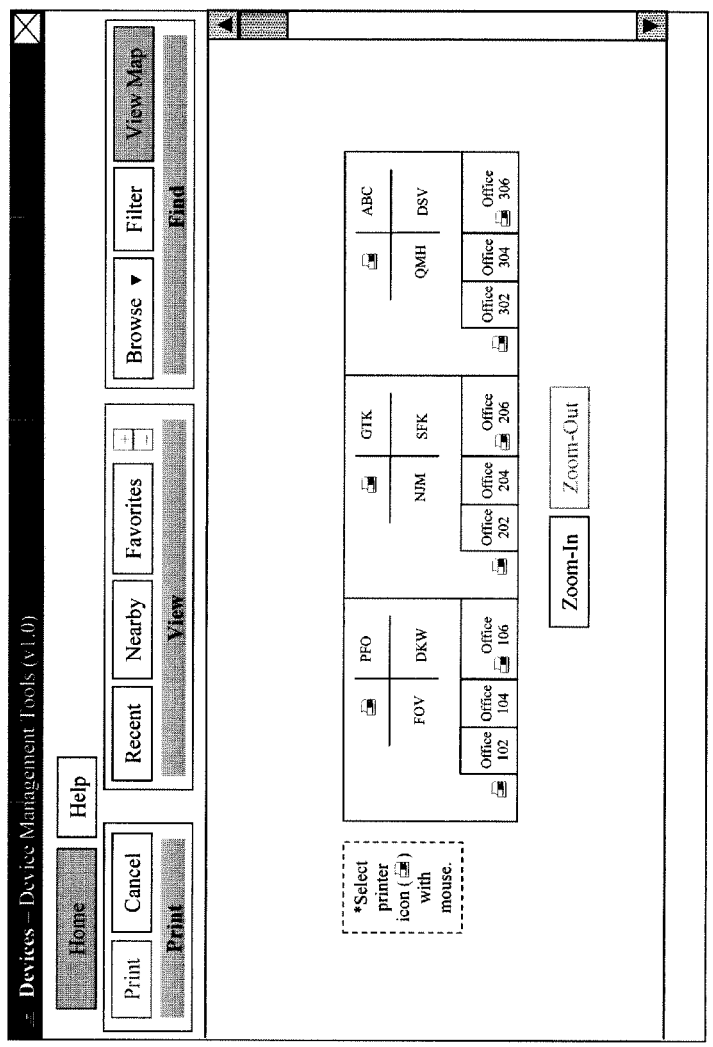
FIGS. 14A-14D show sample screenshots of a printer selection UI, according to an exemplary embodiment.
Figure 14B:
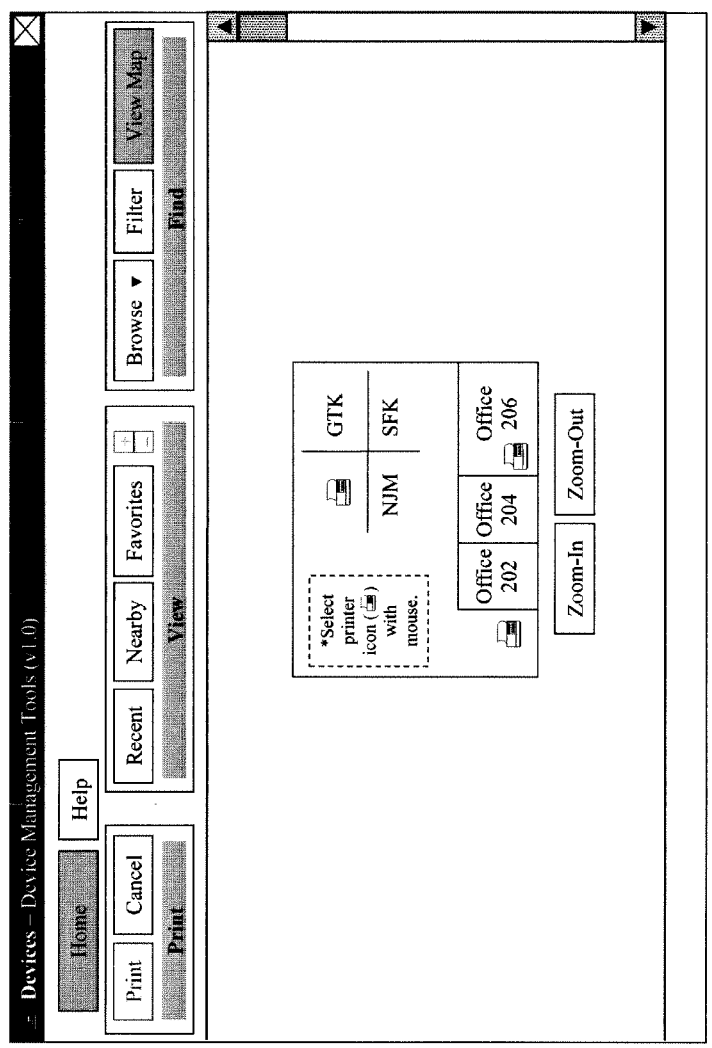
Figure 14C:
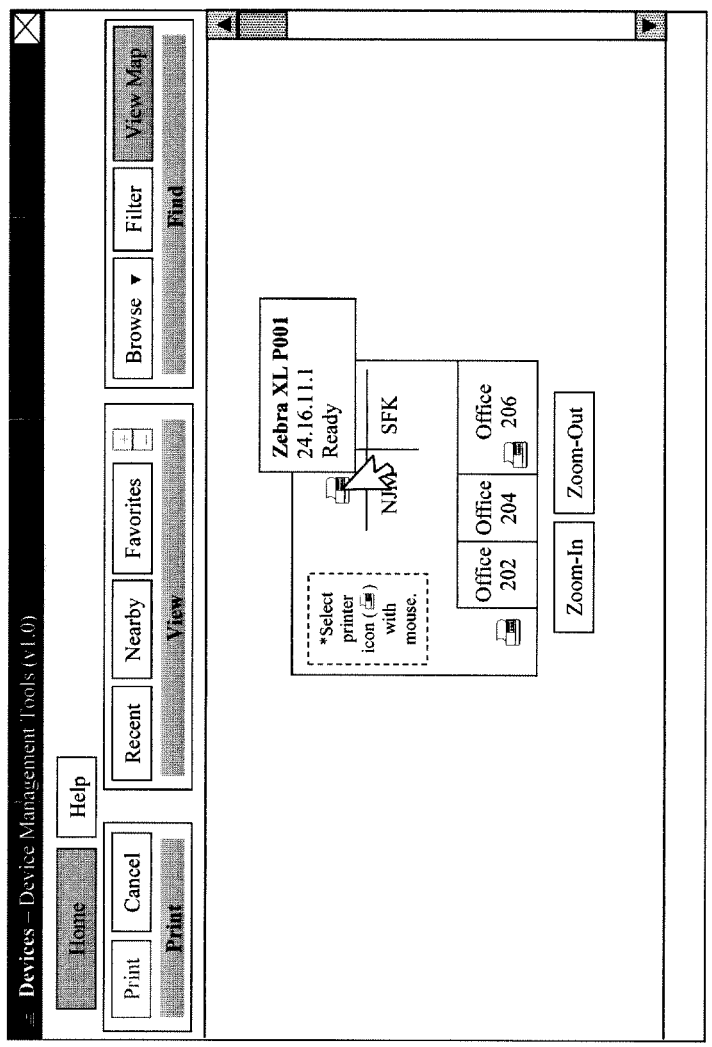
Figure 14D:
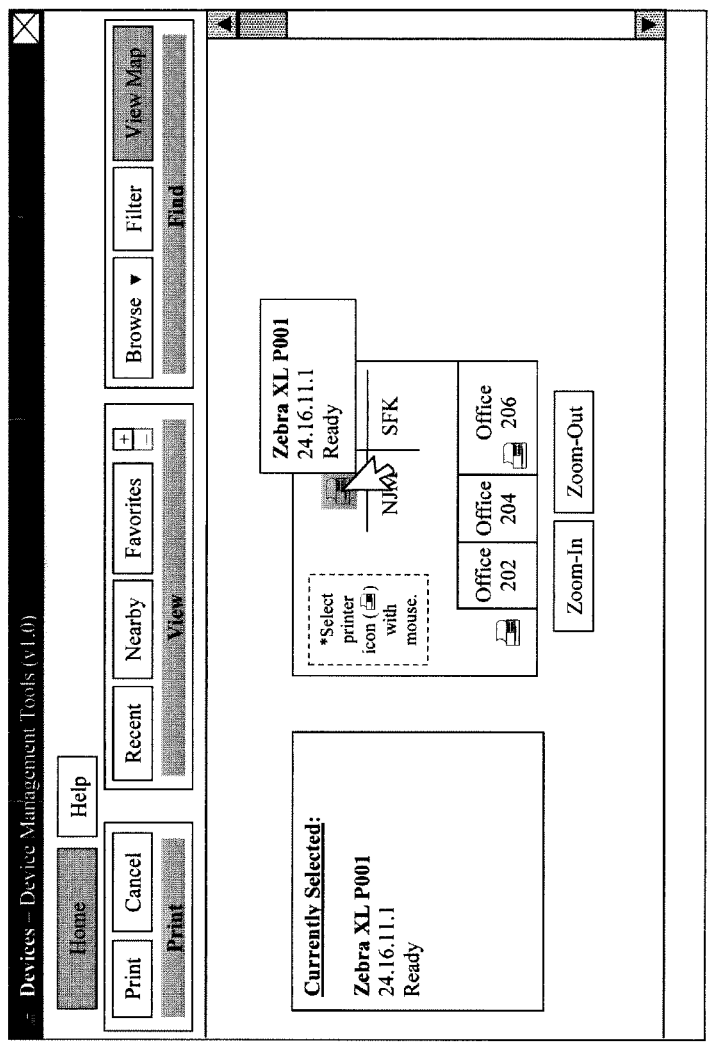

FIG. 14A shows an example in which the user has activated the "view map" button. As shown in FIG. 14A, the displayed map shows the location of the various printers available to the user. The user may activate the "zoom-in" button to zoom in (FIG. 14B), place the cursor on a particular printer to see further details of the particular printer (FIG. 14C), and/or select a printer to print from the selected printer (FIG. 14D).

Figure 16:
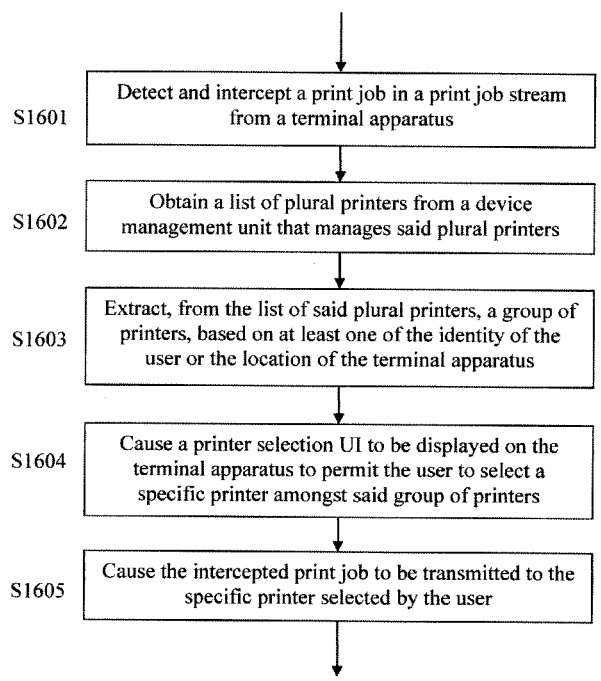

Turning now to FIG. 16, there is shown a flowchart of a method for managing user printing in a network environment, according to an exemplary embodiment.

In S1601, a printer selection program detects and intercepts a print job in a print job stream (step S1055 in FIG. 15) from a terminal apparatus. The printer selection program then obtains a list of plural printers from a device management unit (step S1056 and S1057 in FIG. 15) that manages said plural printers (step S1602), extracts, from the list of said plural printers, a group of printers, (step S1058 in FIG. 15) based on at least one of the identity of the user or the location of the terminal apparatus (step S1603), and causes a printer selection UI to be displayed on the terminal apparatus (step S1059 in FIG. 15) to permit the user to select a specific printer amongst said group of printers (step S1604). When the printer selection program receives user selection of a printer, the printer selection program causes the intercepted print job to be transmitted to the specific printer (step S1060 in FIG. 15) selected by the user (step S1605).

Turning now to FIG. 17, there is shown a flowchart of a method for managing user printing in a network environment, according to an exemplary embodiment.

In S1701, a printer selection program determines based on stored configuration items whether an intercepted print job is to be transmitted directly to a predetermined direct printer or transmitted to a printer selected via a printer selection UI. If the user has specified a direct printer (YES, S1702), the printer selection program transmits the intercepted print job directly to the predetermined direct printer (step S1703). Otherwise, the printer selection program displays a printer selection UI (step S1704), receives user selection of a specific printer (step S1705), and transmits the intercepted print job to the user-selected specific printer (step S1706).

Figure 15:
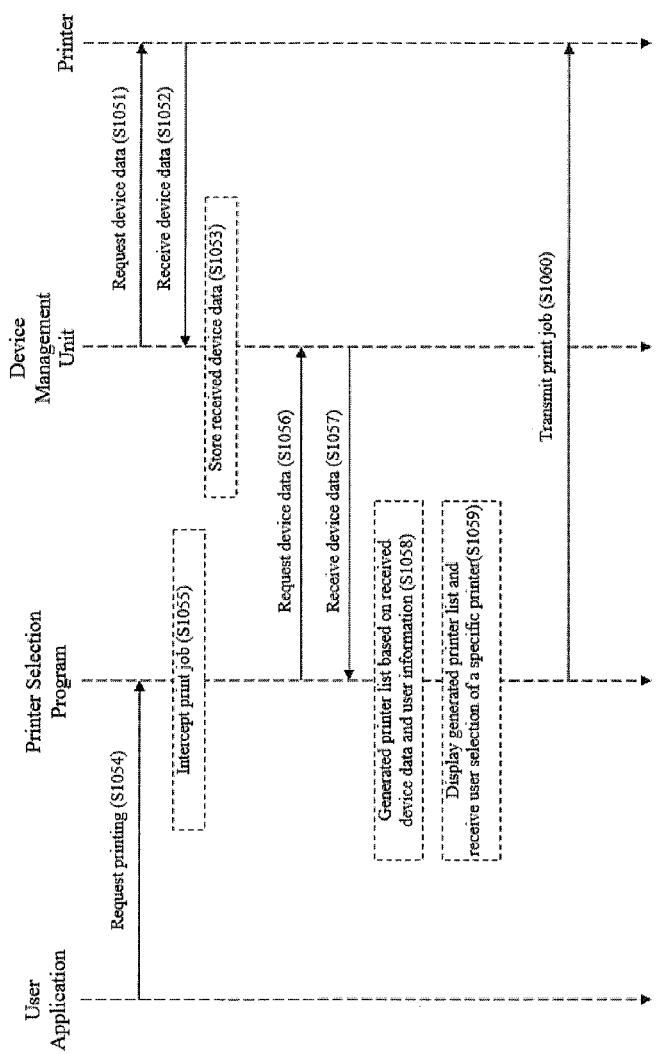
FIGS. 15 and 16 show a data flow diagram and a flow chart, respectively for a method of managing printing in a network environment, according to an exemplary embodiment.

The orders in which the steps are performed in the aforementioned methods are not limited to those shown in the examples of FIGS. 15-17, and may be switched as long as similar results are achieved. Also, it should be noted that the methods illustrated in the examples of FIGS. 15-17 may be implemented using any of the systems described in connection with FIGS. 1-3.

The aforementioned specific embodiments are illustrative, and many variations can be introduced on these embodiments without departing from the spirit of the disclosure or from the scope of the appended claims. For example, elements and/or features of different examples and illustrative embodiments may be combined with each other and/or substituted for each other within the scope of this disclosure and appended claims.

What is claimed is:

1. A system for managing devices accessible through a network, the system including:
   one or more device management apparatuses configured to collect device data from a plurality of printing devices and manage the printing devices;
   a device database registering the device data collected by the device management apparatuses from the plurality of printing devices; and
   a terminal apparatus including a click-to-print unit configured to include:
      a print job detecting part that detects when a print job has been submitted by a user of the terminal apparatus to a print job stream of the terminal apparatus, and holds the print job in the terminal apparatus before transmitting said print job to a printer;
      a mode determination part that determines, while the print job is held in the terminal apparatus, whether the print job is to be processed in job-specific selection mode or silent mode;
      a device management interface part that obtains, from one of the device management apparatuses or from the device database, a list of plural printing devices, upon the print job detecting part detecting the print job;
      a printer group extraction part that extracts, from the list of said plural printing devices, a group of printers, based on at least one of user identification and user location information;
      a printer selection user interface that presents the group of plural printers for the user of the terminal apparatus to select a specific printer amongst the plural printers;
      a mode selection user interface for the user to select the job-specific selection mode or the silent mode and to specify a silent-mode printer that is to be associated with the user and to which print jobs submitted by the user are to be automatically transmitted, without user selection of a printer specifically for any particular job when the silent mode is selected; and
      a print job submission part that causes the print job to be transmitted to the specific printer in response to determination by the mode determination part that the print job is to be processed in the job-specific selection mode, and
   wherein in response to the print job detecting part detecting the print job, the mode determination part determines whether the user has specified a silent-mode printer and
   (a) in response to the mode determination part determining that the user has specified a silent-mode printer, the mode determination part determines that the print job is to be processed in the silent mode, and the print job is transmitted to the silent-mode printer, and
   (b) in response to the mode determination part determining that the user has not specified a silent-mode printer,
      the mode determination part determines that the print job is to be processed in the job-specific selection mode, and
      then the device management interface part obtains, from a device management apparatus or the device database, the list of plural printing devices, and
      then the printer group extraction part extracts, from the list of said plural printing devices, the group of printers, based on at least one of the user identification and the user location information, and
      then the printer selection user interface displays the group of printers extracted by the printer group extraction part and receives selection by the user of the specific printer amongst the group of printers, and
      then the print job submission part causes the print job to be transmitted to the specific printer selected by the user through the printer selection user interface.

2. The system of claim 1, wherein
   the printer selection user interface displays one or more printer groups included in a printer category, each one of said one or more printer groups including one or more printers, and
   when the user selects a specific printer group amongst said one or more printer groups, the printer selection user interface displays, for selection of a particular printer, said one or more printers included in the specific printer group.

3. The system of claim 1, wherein the printer selection user interface further includes a filter part for the user to specify or select filter criteria to filter said printers to display only printer that match the filter criteria.

4. The system of claim 1, wherein the printer group extraction part extracts the group of printers by determining particular printers amongst the plural printers that are located within a predetermined distance from a current location of the terminal apparatus.

5. The system of claim 1, wherein the printer selection user interface further includes a map viewing part for displaying a map view of said printers in the group extracted by the printer group extraction part, in a case that the group of printers is extracted based on the user location information, and
   wherein the map view indicates a location of each specific printer amongst said printers displayed in the map view, and
   when the user selects a printer amongst said one or more printers displayed in the map view, the map viewing part displays properties information of the selected printer.

6. The system of claim 1, wherein the printer group extraction part extracts the group of printers by determining which of the plural printers the user is permitted to access.

7. The system of claim 1, wherein the printer group extraction part extracts, from the list of said plural printing devices, a group of printers, based on at least one of user identification and user location information, that are nearby the terminal apparatus.

8. A printer selection program of instructions embodied in a non-transitory computer-readable medium and executable by a processing unit of a terminal apparatus, to configure the terminal apparatus to include:
- a print job detecting part that detects when a print job has been submitted by a user of the terminal apparatus to a print job stream of the terminal apparatus, and holds the print job in the terminal apparatus before transmitting said print job to a printer;
- a mode determination part that determines, while the print job is held in the terminal apparatus, whether the print job is to be processed in job-specific selection mode or silent mode;
- a device management interface part that obtains a list of plural printers, through a network, from a device management unit that manages said plural printers;
- a printer group extraction part that extracts, from the list of said plural printers, a group of printers, based on at least one of user identity or a location of the terminal apparatus;
- a user interface part that provides a printer selection user interface on the terminal apparatus
  - a printer selection user interface that presents the group of plural printers for the user of the terminal apparatus to select a specific printer amongst the plural printers, and
  - a mode selection user interface for the user to select the job-specific selection mode or the silent mode and to specify a silent-mode printer that is to be associated with the user and to which print jobs submitted by the user are to be automatically transmitted, without user selection of a printer specifically for any particular job, when the silent mode is selected; and
- a print job submission part that causes the print job to be transmitted to the specific printer in response to determination by the mode determination part that the print job is to be processed in the job-specific selection mode,
wherein in response to the print job detecting part detecting the print job, the mode determination part determines whether the user has specified a silent-mode printer and
(a) in response to the mode determination part determining that the user has specified a silent-mode printer, the mode determination part determines that the print job is to be processed in the silent mode, and the print job is transmitted to the silent-mode printer and
(b) in response to the mode determination part determining that the user has not specified a silent-mode printer, the mode determination part determines that the print job is to be processed in the job-specific selection mode, and
  - then the device management interface part obtains, from the device management unit, the list of plural printers, and
  - then the printer group extraction part extracts, from the list of said plural printers, the group of printers, based on at least one of the user identification and the user location information, and
  - then the printer selection user interface displays the group of printers extracted by the printer group extraction part and receives selection by the user of the specific printer amongst the group of printers, and
  - then the print job submission part causes the print job to be transmitted to the specific printer selected by the user through the printer selection user interface.

9. The printer selection program of instructions embodied in a non-transitory computer-readable medium of claim 8, wherein the printer selection user interface includes a printer viewing part that displays the printers in the group extracted by the printer group extraction part, in a list view format.

10. The printer selection program of instructions embodied in a non-transitory computer-readable medium of claim 8, wherein the printer selection user interface includes a printer viewing part that displays icons representing the printers, respectively, in the group extracted by the printer group extraction part.

11. The printer selection program of instructions embodied in a non-transitory computer-readable medium of claim 8, wherein
the printer selection user interface further includes a printer locating part indicating printer groups included in a printer category, each of said printer groups including one or more printers, and
when the user selects a specific printer group amongst said printer groups, the printer viewing part displays said one or more printers included in the specific printer group.

12. The printer selection program of instructions embodied in a non-transitory computer-readable medium of claim 8, wherein the printer selection user interface further includes a map viewing part for displaying a map view of said printers in the group extracted by the printer group extraction part, and
the map viewing part includes a zoom-in button for zooming in on a portion of the map and a zoom-out button for zooming out of a portion of the map.

13. The printer selection program of instructions embodied in a non-transitory computer-readable medium of claim 8, wherein the device management interface part communicates with the device management unit to obtain location information of said one or more printers to be displayed by the printer selection user interface.

14. The printer selection program of instructions embodied in a non-transitory computer-readable medium of claim 8, wherein the printer selection user interface further includes
a favorite printer selection part for permitting the user to select a specific printer amongst said one or more displayed printers to add the specific printer to a favorite printer list, and
a favorite printer viewing part for displaying one or more printers added to the favorite printer list by the user.

15. The printer selection program of instructions embodied in a non-transitory computer-readable medium of claim 8, wherein the printer selection user interface further includes a recent printer viewing part for displaying a list of printers to which the user has recently submitted print jobs.

16. A method performed by a terminal apparatus to facilitate quick printing of documents, files and/or other pages, the method comprising:
(a) providing a mode selection user interface for a user of the terminal apparatus to select a job-specific selection mode or a silent mode and to specify a silent-mode printer that is to be associated with the user and to which print jobs submitted by the user are to be automatically transmitted, without user selection of a printer specifically for any particular job, when the silent mode is selected;
(b) detecting when a print job has been submitted by a user of the terminal apparatus to a print job stream of the terminal apparatus and holding the print job in the terminal apparatus before transmitting said print job to a printer;

(c) determining, in response to detection in (b) of the print job and while the print job is held in the terminal apparatus, whether the user has specified a silent-mode printer;

(d) determining, in response to determining in (c) that the user has specified a silent-mode printer, that the print job is to be processed in the silent mode, and then transmitting the print job to the silent-mode printer, and (e) determining, in response to determining in (c) that the user has not specified a silent-mode printer, that the print job is to be processed in the job-specific selection mode, and (e1) then obtaining a list of plural printers, through a network, from a device management system that manages said plural printers, and (e2) then extracting, from the list of said plural printers, a group of printers, based on at least one of user identity and user location, and (e3) then displaying, via a printer selection user interface on the terminal apparatus, the group of printers extracted (e2), to permit the user to select a specific printer amongst the plural printers, and receiving selection by the user of the specific printer amongst the group of printers, and (e4) then causing the print job to be transmitted to the specific printer.

* * * * *